United States Patent [19]

Sawaki et al.

[11] Patent Number: 5,648,874
[45] Date of Patent: Jul. 15, 1997

[54] OPTICAL APPARATUS

[75] Inventors: Ippei Sawaki; Michio Miura; Yoshiro Ishikawa; Fumitaka Abe, all of Kawasaki, Japan

[73] Assignee: Fujitsu Limited, Kawasaki, Japan

[21] Appl. No.: 495,171

[22] Filed: Jun. 27, 1995

[30] Foreign Application Priority Data

Jun. 29, 1994 [JP] Japan .................. 6-147361
May 31, 1995 [JP] Japan .................. 7-133931
Jun. 12, 1995 [JP] Japan .................. 7-144763

[51] Int. Cl.⁶ .................................. G02B 27/10
[52] U.S. Cl. ................................ 359/622; 359/619
[58] Field of Search ........................ 359/622, 621, 359/619

[56] References Cited

U.S. PATENT DOCUMENTS 5,270,859 12/1993 Wirth et al. ..................... 359/622

FOREIGN PATENT DOCUMENTS 63-263520 10/1988 Japan .
4-326655 11/1992 Japan .
2077939 12/1981 United Kingdom ............ 359/619

*Primary Examiner*—David P. Porta
*Assistant Examiner*—Richard Hanig
*Attorney, Agent, or Firm*—Armstrong, Westerman, Hattori, McLeland & Naughton

[57] ABSTRACT

An optical apparatus having a first lens array consisted of a plurality of lens forming reduced image in reversed orientation, a second lens array consisted of a plurality of lens arranged at corresponding positions to the lens of the first lens array and forming erected equal magnification image from the reduced image by expanding the reduced image in the given magnification, and one or more light shielding film arranged between the first lens array and the second lens array and having through openings for passing light discharged from respective lens of the first lens array at positions corresponding to respective lens of the first lens array in opposition to respective lens for passing discharged light from respective lens of the first lens array.

22 Claims, 18 Drawing Sheets

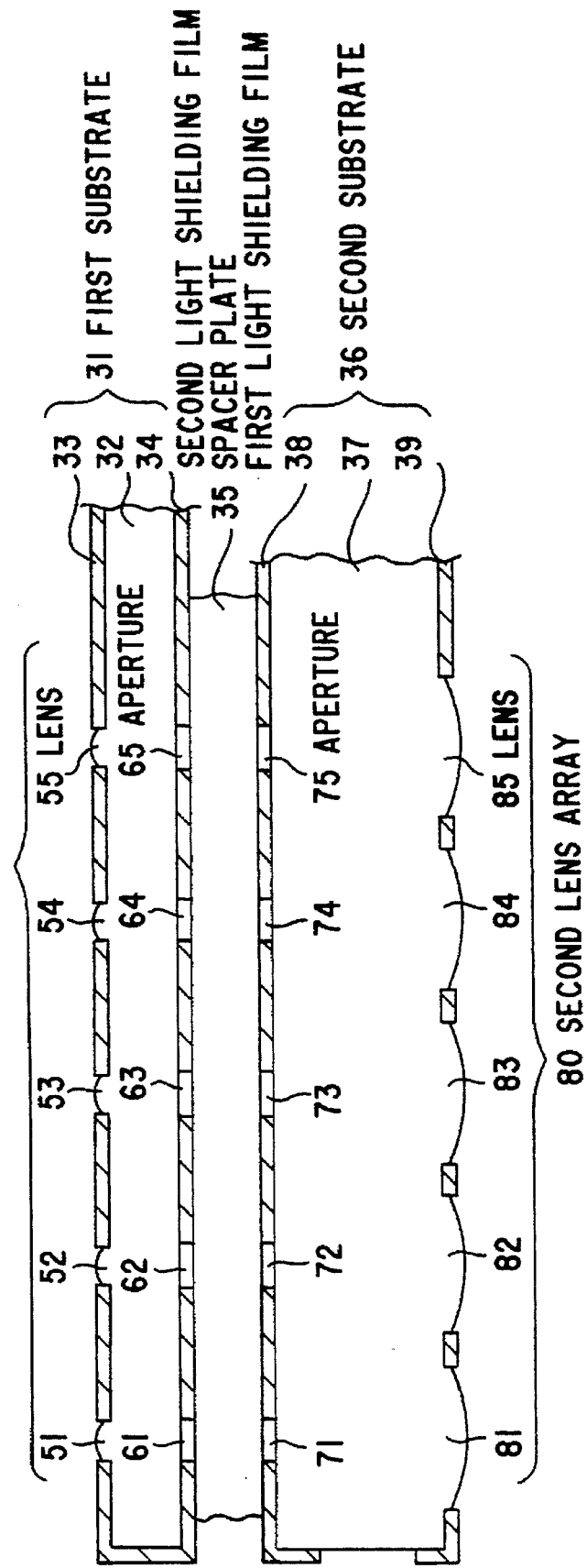

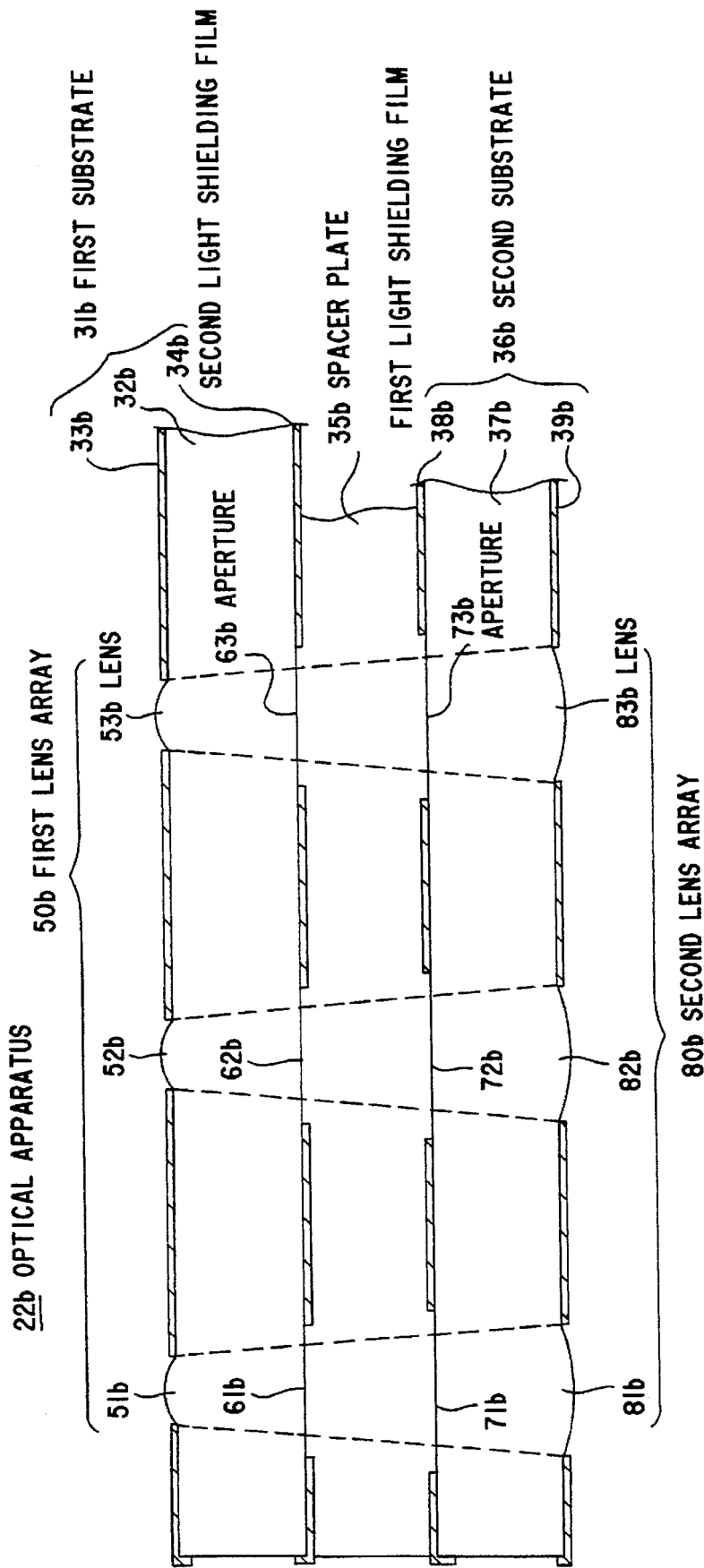

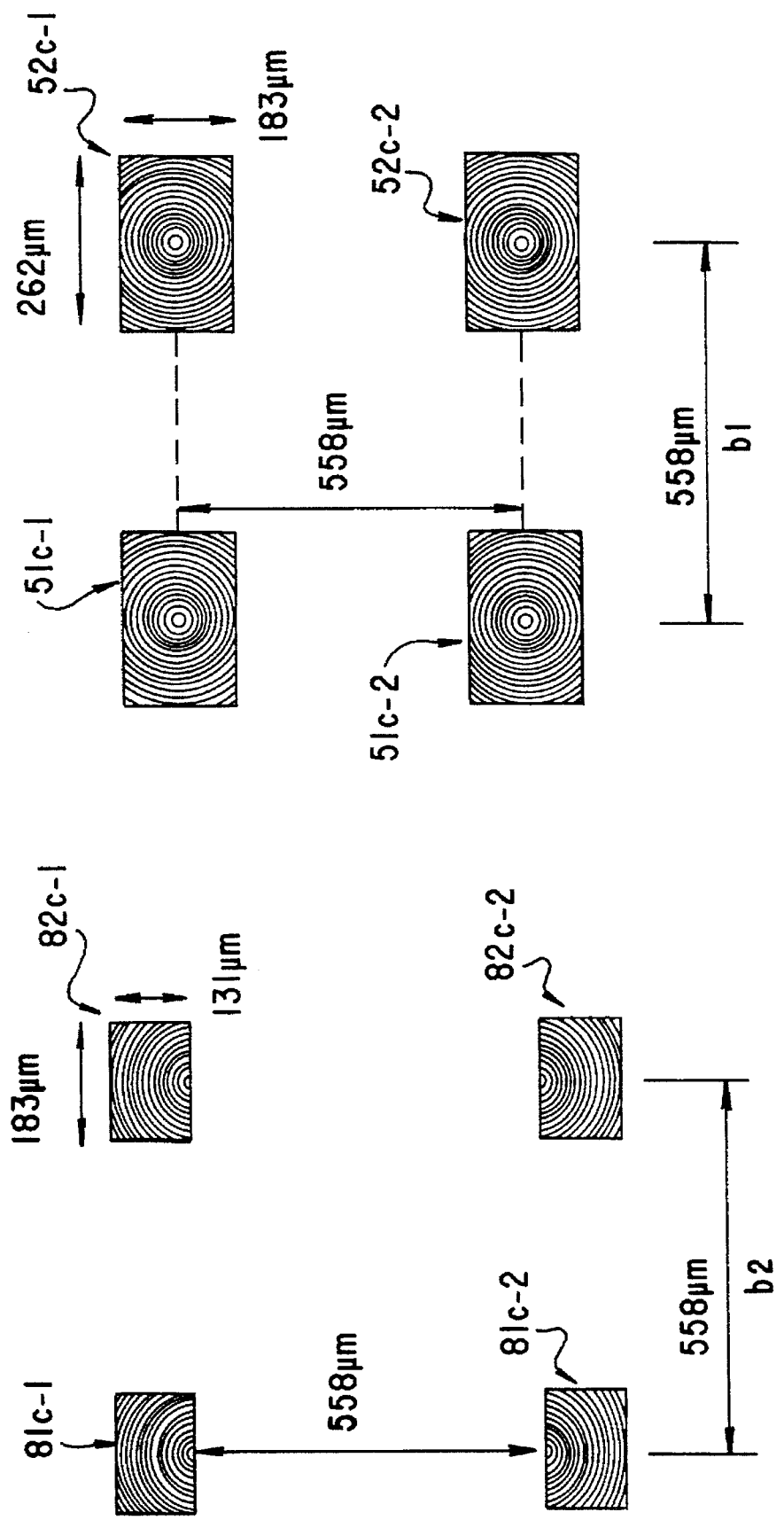

DIOPTRIC TYPE LENS

DIFFRACTION TYPE FRESNEL LENS

BINARY LENS

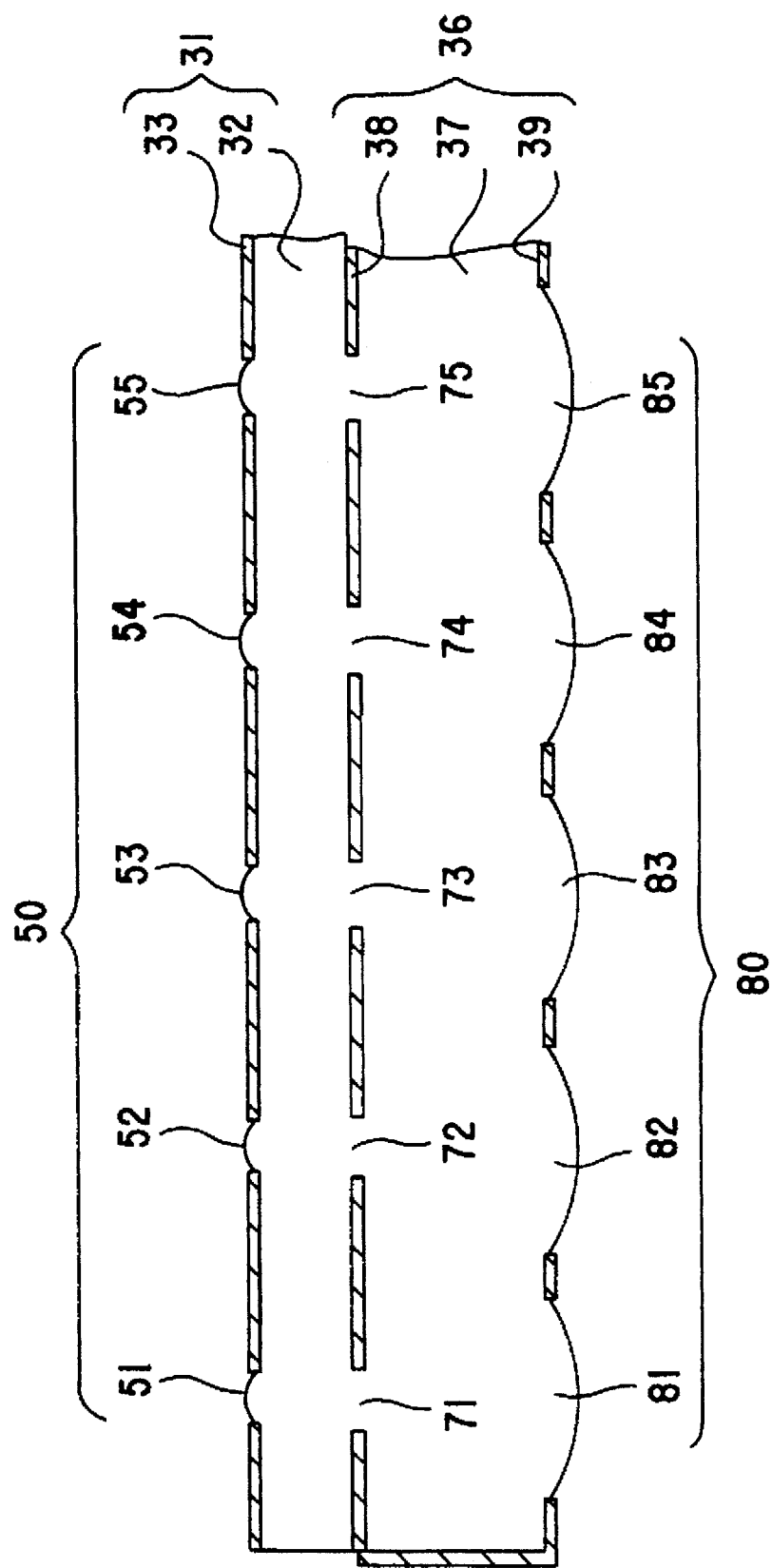

1. WASHING SUBSTRATE (QUARTS)

2. DEPOSITING Ti(500A)

3. FORMING MARKER

4. RESIST/PRE-BAKING/EXPOSURE

5. PEB/DEVELOPMENT/POST-BAKING

6. RIE

7. WASHING

8. RESIST FOR PROTECTING/BAKING

9. REMOVING Ti

10. DEPOSITING Ti/WASHING

11. RESIST/PRE-BAKING/EXPOSURE

12. PEB/DEVELOPMENT/POST-BAKING

13. RIE

14. WASHING

15. RESIST FOR PROTECTING/BAKING

16. REMOVING Ti

17. DEPOSITING LIGHT SHIELDING LAYER (Cr$_2$O$_3$/Tl)/WASHING

18. RESIST/PRE-BAKING

19. EXPOSURE/PEB/DEVELOPMENT/POST-BAKING

20. WET ETCHING

21. REMOVING RESIST

22. RESIST FOR PROTECTING/BAKING

23. DEPOSITING LIGHT SHIELDING LAYER ON THE APERTURE SURFACE ($Cr_2O_3/Cr/Cr_2O_3$)/WASHING

24. RESIST/PRE-BAKING

25. EXPOSURE/DEVELOPMENT/ POST-BAKING

26. WET ETCHING

27. REMOVING RESIST

28. COMPLETED SUBSTRATE

OPTICAL APPARATUS

BACKGROUND OF THE INVENTION

1. Field of the Invention

The present invention relates to an optical apparatus for reading an image or forming an image to be employed in an image scanner, LED printer and so forth.

2. Description of the Related Art

As an optical apparatus for reading an image, there are apparatus employing a reduction optical system which forms a reduced image of an original on an image sensor, such as a CCD and so forth by means of a convex lens and apparatus employing an equal magnification optical system which forms an equal magnification image of the original on an elongated image sensor employing graded refractive type lens array, a rod lens array and so forth. Since the original surface and the image sensor are placed in close proximity to each other, the latter will also referred to as contact optical system.

When the apparatus is made compact, the contact optical system is advantageous. For example, when the contact optical system is employed in a portable image scanner, the apparatus employing contact optical system, has to be made further compact.

In the graded refractive type lens array or the rod lens array to be employed in the optical apparatus employing the contact optical system, it is difficult to set a focal distance to be in the order of several mm or less. In practice, approximately 15 to 20 mm of focal distance is required.

On the other hand, in a micro-lens array formed with a plurality of fine lens on a substrate, it is possible to produce a lens having short focal distance relatively easily by selecting production process and so forth. Also, it is possible to form an erecting equal magnification image by employing a plurality of stages of lens array. Therefore, there has been proposed to avoid parallax by projecting a display image of a liquid crystal display on a protecting glass placed in front thereof (Japanese Unexamined Patent Publication No. SHO 63-263520).

As set forth above, in order to make the optical apparatus compact, it becomes necessary to shorten an optical length. However, in case of the graded refractive type lens array or the rod lens array, it is practically impossible to shorten the optical length to be shorter than or equal to 10 mm.

Accordingly, for application to an ultra-compact card type image scanner for reading original in size of a name card size, for example, the conventional apparatus is not sufficiently compact. In addition, since the graded refractive type lens array or the rod lens array is expensive, it is not possible to realize sufficiently low price as personal use apparatus.

Also, in the conventional micro-lens array, removal of crosstalk light from adjacent lens is difficult. Furthermore, in order to enhance efficiency of use of the light, three stages or more of lens array become necessary to make the structure complicate.

Namely, as shown in FIG. 21(a), when a magnification of an intermediate image is 1 and two stages of lens arrays are employed, substantial part of light other than the central portion of the intermediate image may be directed out of the opening portion of the lower lens to cause fluctuation of brightness in the formed image. Also, crosstalk cannot be avoided. For improvement, when the third stage intermediate lens is inserted at the position of the intermediate image (see Japanese Unexamined Patent Publication No. SHO 63-263520), while the problem of fluctuation in brightness of the image can be solved, the structure becomes complicate and the problem of crosstalk from the adjacent lens is maintained unsolved.

On the other hand, it is considered to employ normal convex lens and a light shielding cylindrical body for preventing crosstalk in combination in place of the conventional rod lens. However, in such case, since it is required to absorb the light on the inner periphery of the cylindrical body, production of such cylindrical body is difficult. Therefore, such apparatus is not suitable for mass-production.

SUMMARY OF THE INVENTION

It is an object of the present invention to provide an optical apparatus which can minimize crosstalk by employing two lens arrays and disposing a light shielding film therebetween and also can realize down-sizing and cost-down.

In accordance with one aspect of the present invention, there is provided an optical apparatus comprising: a first lens array consisted of a plurality of lens to form a reduced image in reversed orientation; a second lens array consisted of a plurality of lens, arranged at positions corresponding to respective lens in the first lens array, and forming an erected equal magnification image from the reduced image by expanding the reduced image in the given magnification; and at least one light shielding film arranged between the first lens array and the second lens array and having through openings for passing light discharged from respective lens of the first lens array at positions corresponding to respective lens of the first lens array.

Since the present invention is constructed as set forth above, crosstalk can be minimized and down-sizing and lowering of cost can be realized.

When the light shielding film is consisted of first light shielding film and second light shielding film, the second light shielding film is arranged between the first light shielding film and the first lens array. When the light shielding film is consisted of first light shielding film and second light shielding film, the invention provides the optical apparatus, in which the first lens array and one light shielding film are formed on opposite surfaces of a first substrate, the second lens array and other shielding film are formed on opposite surfaces of a second substrate, and the first and second substrates mate with the surfaces of the light shielding films with each other and fixed to each other via a transparent spacer plate.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 2 is a partially sectioned illustration showing the preferred embodiment of the optical apparatus according to the present invention;

FIG. 5 is a partially sectioned illustration of another embodiment of the optical apparatus according to the present invention;

FIG. 9 is a partial enlarged illustration showing arrangement of lens arrays (50c, 80c) shown in FIG. 7;

FIG. 12 is an illustration showing a construction of the embodiment where a light shielding film is single in the optical apparatus according to the present invention;

DESCRIPTION OF THE PREFERRED EMBODIMENTS

Figure 1:
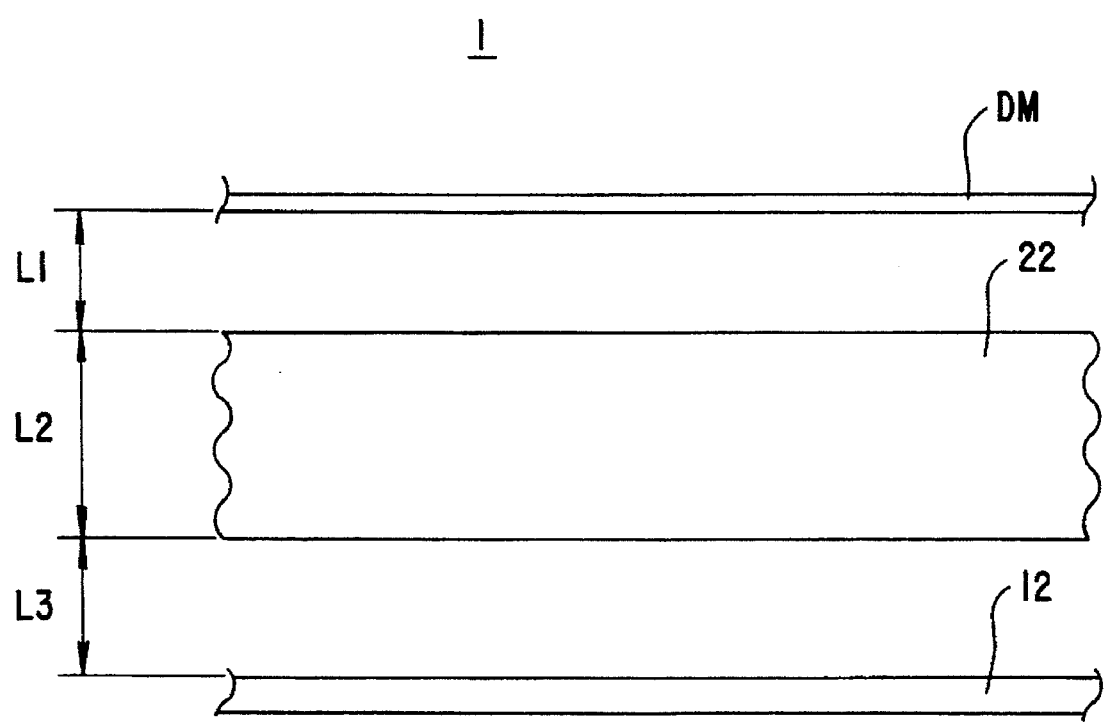
FIG. 1 is a partially sectioned illustration of an image reading apparatus employing an optical apparatus according to the present invention.

The present invention will be discussed hereinafter in terms of the preferred embodiments in detail with reference to the accompanying drawings.

The present invention provides an optical apparatus which includes a first lens array consisted of a plurality of lens forming a reduced image in the reversed orientation; a second lens array consisted of a plurality of lens arranged at positions corresponding to respective lens in the first lens array, and forming an erected equal magnification image from the reduced image by expanding the reduced image in the given magnification; and at least one light shielding film arranged between the first lens array and the second lens array and having through openings for passing light discharged from respective lens of the first lens array at positions corresponding to respective lens of the first lens array.

Here, when the light shielding film is single, the light shielding film may be arranged at the position of an image plane of the reduced image formed by respective lens of the first lens array. In the alternative, the light shielding film may be arranged at substantially intermediate position between the first and second lens arrays.

Also, the present invention provides the optical apparatus, in which the light shielding film is formed with through openings having opening width substantially not restricting an optical path from respective lens of the first lens array to corresponding lens of the second lens array, but substantially blocking the optical path from respective lens of the first lens array to the lens adjacent to the lens of the second lens array corresponding to the lens of the first lens array.

On the other hand, the present invention provides the optical apparatus, wherein, when the light shielding film is single, the first lens array and one light shielding film are formed on opposite surfaces of a first substrate; the second lens array is formed on one surface of a second substrate; and the surface of the first substrate where the light shielding film is formed and the surface of the second substrate where the second lens array is not formed are fixed with mating each other.

When the light shielding film is constituted of first light shielding film and second light shielding film, the second light shielding film being arranged between the first light shielding film and the first lens array.

When the light shielding film is consisted of two light shielding films, it is possible that the first light shielding film is arranged at the position of the image plane of the reduced image formed by respective lens of the first lens array. It is also possible that a distance between the first light shielding film and the second light shielding film, a distance between the second light shielding film and the first lens array, and a distance between the first light shielding film and the second light shielding film are substantially equal to each other.

Also, when two light shielding films are employed, the invention provides an optical apparatus, in which the first lens array and one light shielding film are formed on opposite surfaces of a first substrate; the second lens array and the first light shielding film are formed on opposite surface of a second substrate; and the first and second substrates mate with the surface of the light shielding films with each other and fixed to each other via a transparent spacer plate.

Also, the present invention provides the optical apparatus, in which the first lens array and the second lens array are formed surfaces of respective substrates, and surface portions of the substrates, where the first and second lens arrays are not present, have light shielding ability.

Furthermore, it is possible to have a construction, in which respective lens of the first and second lens arrays are aligned with an equal distance, and the width in the aligning direction of respective lens of one of the first and second lens arrays is set to be even number multiple of a product of a pitch between said lens and a reduction ratio of the reduced image formed by said lens.

As materials for the light shielding film, Cr, Ti and so forth may be employed. Also, it is possible to laminate one of these with a dielectric body, such as $Cr_2O_3$ for providing reflection preventing function. Furthermore, it is possible to employ black color paint and so forth.

As lens forming the first lens array and the second lens array, normally employed dioptic type optical lens may be employed. However, in view of down-sizing, it is desirable to employ Fresnel lens. Also, binary lens having a plurality of levels of step form convex may also be used.

As the material of the lens, it is preferred to use quartz. However, acryl resin, polymethylmetacrylate resin (PMMA resin) and other optical synthetic resin may be used. It is further possible to offset the center in the configuration to the optical center. Also, the optical center may be placed on the outer edge of the contour of the lens or outside thereof.

Also, the present invention provides the optical apparatus, in which the first lens array and the second lens array respectively constitutes two rows of lens groups aligned in the same pitch, and real images obtained through respective lens groups are composed to form one real image.

On the other hand, the present invention provides an image reading apparatus which comprises an optical apparatus constructed as set forth above, a light irradiating device, and an image sensor for optoelectrically converting a real image formed by a light irradiated from the light irradiating device and past through the optical apparatus.

Here, the light irradiating device may comprise a light source and a light guide device arranged between an image to be read and the optical apparatus for guiding the light from the light source to said image for irradiation on the latter.

Also, the light guide device may be a light guide plate made of transparent material and having a light receiving opening for introducing the light from said light source within the material, a first reflector body reflecting the light from the light source introduced through the light receiving opening within the material, a second reflector body for reflecting a light reflected by the first reflector body within the material, an irradiating opening for passing the light reflected by the second reflector body to irradiate on the image, and a passing opening for passing the light reflected from the image past through the irradiating opening to the optical apparatus.

Furthermore, the present invention provides an image forming apparatus comprises an optical apparatus as set forth above, a light irradiating device irradiating desired light pattern; a photosensitive body for forming a latent image by irradiating a illumination pattern formed by a light irradiated by the light irradiating device and past through the optical apparatus.

FIG. 1 is a partially sectioned illustration of an image reading apparatus 1 employing the preferred embodiment of an optical apparatus according to the present invention.

The image reading apparatus 1 includes a strip form image sensor 12 which is constituted of a CCD and so forth, an optical apparatus 22 and not shown drive mechanism, housing, control circuit, signal processing circuit and so forth.

The image sensor 12 and the optical apparatus 22 are mutually coupled integrally. Also, for the integrated assembly of the image sensor 12 and the optical apparatus 22, a not shown light source for lighting an original DM is also integrally mounted. By such construction, a scanner extending in left and right direction of FIG. 1 is constructed. By shifting this scanner in a direction perpendicular to the sheet surface of FIG. 1, the surface of the original DM arranged above the optical apparatus 22 is scanned for reading the image on the original and converting the read image into the electric signal. At this time, the optical apparatus 22 introduces a reflected light from the original DM to the image sensor 12 to form the erected equal magnification image of the image on the original DM on the image sensor 12.

The thickness L2 of the optical apparatus 22 is approximately 1.275 mm, for example. The distance L1 between the optical apparatus 22 and the original DM is approximately 1.6 mm, for example, and the distance L3 between the optical apparatus 22 and the image sensor 12 is approximately 1.8 mm, for example.

First Embodiment

FIG. 2 shows the preferred embodiment of the optical apparatus according to the present invention.

The optical apparatus 22 is constructed by integrally mounting a first substrate 31, a spacer plate 35 and a second substrate 36.

A matrix 32 as the major portion of the first substrate 31 is formed into a thin strip in a thickness of approximately 300 µm of a transparent synthetic resin, such as acryl resin, PMMA resin and so forth. On the surface of the first substrate 31, a first lens array 50 consisted of a plurality of lens 51, 52, 53, . . . arranged in alignment in lateral direction with an equal pitch.

Here, as the lens, normally employed optical lens, Fresnel lens, or a binary lens as thin lens with step form surface may be employed.

Figure 10A:
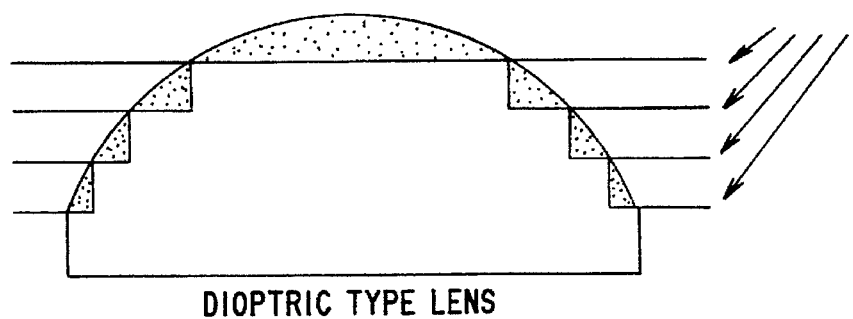
FIGS. 10(A) to 10(C) are sections showing configurations of various lens.
Figure 10B:
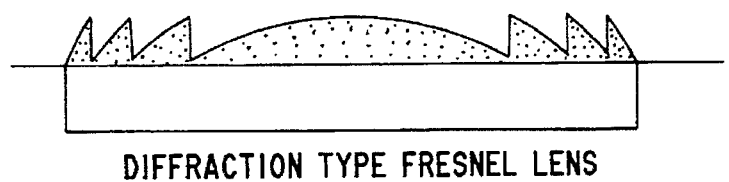
Figure 10C:
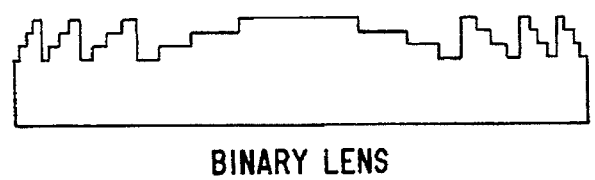

FIGS. 10(A) to 10(C) are sections showing configurations of various lens.

FIG. 10(A) shows a normally employed dioptric type lens. FIG. 10(B) shows a diffraction type Fresnel lens as an example of a diffracting optical element which is a lens formed by removing a portion not affecting for wave converting function from the dioptric type lens. FIG. 10(C) shows a binary lens which is employed in the embodiment discussed later. The binary lens is a lens on which the spherical portion of the surface of the diffraction type Fresnel lens is approximated by the stepped configuration. The binary lens is variable of diffraction efficiency depending upon number of levels and has higher efficiency at greater number of levels. In FIG. 10(C), the binary lens having four levels is illustrated.

Respective lens 51, 52, 53, . . . of the first lens array 50 have the same configuration and have 75 µm in opening diameter, 480 µm of focal distance within the matrix 32 (namely within the synthetic resin), and 350 µm in pitch between the lens.

The matrix 32 having the first lens array 50 is produced in such a manner that a pattern is initially prepared by performing etching or so forth on a glass plate, a mold is prepared on the basis of the pattern, the matrix 32 is shaped by casting a synthetic resin in the mold. By employing synthetic resin as a material of the matrix 32, mass-production with the mold becomes easy. However, as the material of the matrix 32, glass can also be employed. In the latter case, higher transparency than the resin matrix 32 can be attained. However, since the matrix 32 is quite thin, transparency will not creates substantial difference in performance. It should be noted that when acryl resin or PMMA resin is used as the synthetic resin, a deflection index becomes approximately 1.5.

On the surface of the matrix 32 wherein the first lens array 50 is provided, light shielding film 33 is formed on the portion where the lens 51, 52, 53, . . . are not formed.

The light shielding film 33 is adapted to block external light and to prevent the light from reflecting within the matrix 32. Therefore, the light shielding film 33 is formed by a nonreflective coating formed by overlying a thin film of oxide on a deposited later of metal to have a reflectance in the order of several percent, or a black paint layer formed by coating, printing or so forth.

For example, as the metal, Cr is used and as the oxide, $Cr_2O_3$ is used.

On the other hand, on the other surface (lower surface in FIG. 2) of the matrix 32, a second light shielding film 34 is formed in the similar material and similar process to the light shielding film 33 set forth above. In the second light shielding film 34, apertures 61, 62, 63, ... having 85 μm of opening diameter are formed at the positions respectively opposing to respective lens 51, 52, 53, ....

The matrix 37 as the major portion of the second substrate 36 is formed into a strip form in a thickness of approximately 675 μm of the similar material to the substrate 32. On the surface at the lower side in FIG. 2, a second lens array 80 consisted of a plurality of lens 81, 82, 83, ... arranged in alignment in the lateral direction with an equal pitch.

Respective lens 81, 82, 83, ... of the second lens array 80 have mutually the identical configuration. Each lens has 270 μm of opening diameter, 540 μm of focal distance within the matrix 37, and 350 μm of pitch between adjacent lens similarly to the lens 51, 52, 53, ... as set forth above. The matrix 37 having the second lens array 80 is produced through the same process to the foregoing matrix 32.

On the lower surface, on which the second lens array 80 is formed, light shielding film 39 is formed at the portions where the lens 81, 82, 83, ... are not formed. The light shielding film 39 is adapted to block the external light and to prevent the light from reflecting within the matrix 37. The light shielding film 39 is formed by the deposited layer of a metal or coated or printing black paint layer and so forth, similarly to the light shielding film 33.

On the other hand, on the surface of the matrix 37 (upper surface in FIG. 2), a first light shielding film 38 is formed in the same manner to the light shielding film 39. In the first light shielding film 38, apertures 71, 72, 73, ... of 87.5 μm in opening diameter and of circular configuration are formed at respective positions opposing to respective lens 51, 52, 53, ....

The spacer plate 35 is formed of a transparent synthetic resin, such as the acryl resin or PMMA resin. The spacer plate 35 is in a thin strip form having a thickness of approximately 300 μm. Via the spacer plate 35, the first substrate 31 and the second substrate 36 are bonded by a bond to be integrally fixing with each other.

When the optical apparatus 22 formed as set forth above is employed and when the original DM as shown in FIG. 1 is arranged at a distance of 1.6 mm from the optical apparatus 22, reversed real images reduced into one quarter of the original by the lens 51, 52, 53, ... are formed at the positions of the first light shielding film 38, namely at the position of the apertures 71, 72, 73, .... At this time, since the opening diameters (87.5 μm) of the apertures 71, 72, 73, ... are set at one quarter of the lens pitch (350 μm) of the lens, only image for 350 μm in front of the lens 51, 52, 53, ... is extracted by respective apertures 71, 72, 73, ....

The reversed real image formed at the positions of the apertures 71, 72, 73, ... are formed as erected real image on the image sensor 12 through lens 81, 82, 83, .... At this time, the distance between the lens 81, 82, 83, ... and the image sensor 12 is 1.8 mm. Therefore, by the lens 81, 82, 83, ..., the image is expanded for four times. As a consequence, the erected image of equal magnification to the original DM can be formed on the image sensor 12. Since the images by the lens 51, 52, 53, ... can be extracted precisely by the apertures 71, 72, 73, ... without any excess or deficiency, the image of the original can be exactly reproduced on the image sensor 12.

Such optical apparatus 22 can achieve overall distance (thickness) of less than or equal to 5 mm (L1+L2+L3= approximately 4.675 mm) from the original DM to the image sensor 12, as shown in FIG. 1. Therefore, conjugate length much shorter than that can be achieved by the conventional optical apparatus can be achieved so as to significantly contribute for down-sizing of the apparatus.

Next, manner of prevention of cross talk in the shown optical apparatus 22 will be discussed with reference to FIG. 3.

Figure 3:
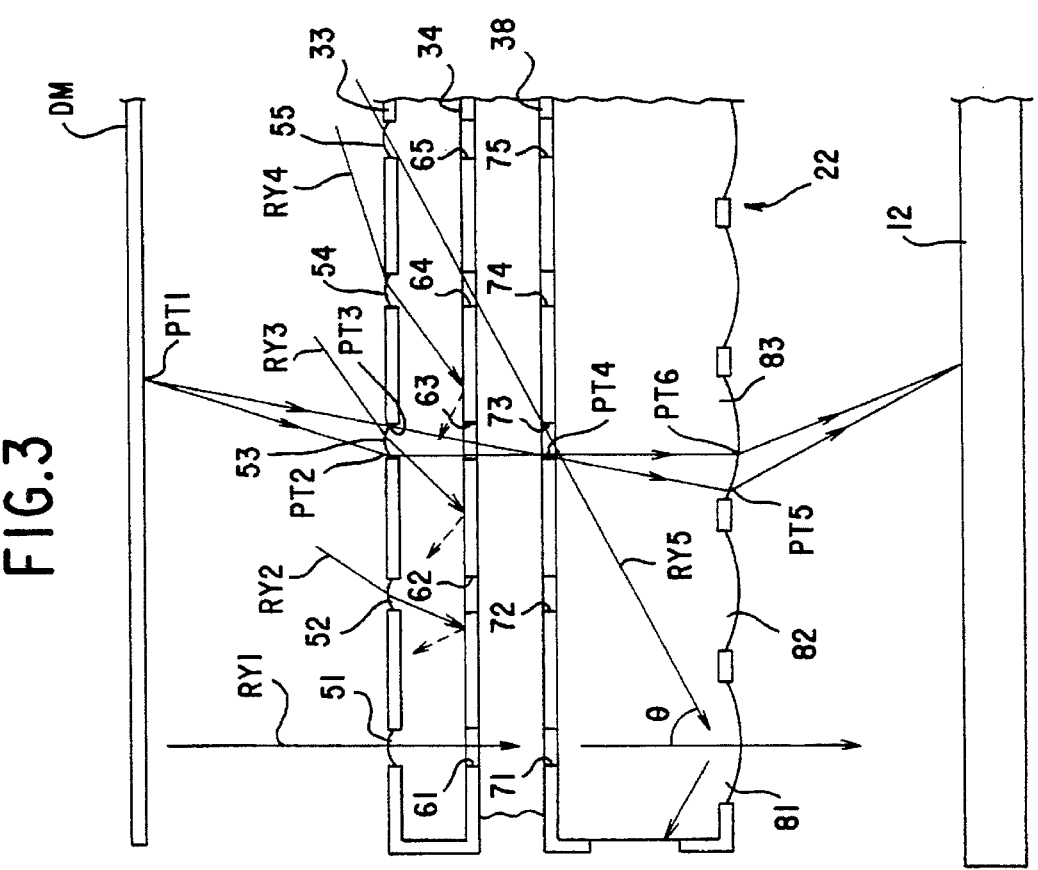
FIG. 3 is an illustration showing an incident light to the optical apparatus according to the present invention.

FIG. 3 shows a condition of the incident light for the optical apparatus 22.

A incident light RY1 from the original DM to the lens 51 is discharged from the lens 81 through the apertures 61 and 71 and reaches to the image sensor 12. Incident lights RY2, RY3 and RY4 from the lens 52, 53 and 54 are shielded or blocked by the second light shield film 34 so as not to reach the lens 81. The incident light RY5 from the lens 55 may reach the lens 81 through the apertures 64 and 73. However, even in such case, since the incident angle θ of the lens exceed a critical angle θc, total internal reflection is caused at the lend 81. Therefore, such incident light may not be discharged from the lens 81 and thus cannot reach the image sensor 12.

Thus, with taking the lens 51 as example, the incident lights RY2, RY3, RY4, ... from other than lens 51 may not reach the image sensor 12. Accordingly, crosstalk from the adjacent lens becomes zero to permit reading of clear image from the original DM and the contrast of the real image on the image sensor 12 is not dropped.

Next, discussion will be given for efficiency of use of the light in the optical apparatus 22.

In FIG. 3, the light discharged from one point PT1 (PT1 corresponding to the portion of the contour of the image formed by the lens 53) on the original DM incides between the point PT2 and the point PT3 of the lens 53 and then forms a reduced intermediate image at the point P4. Thereafter, the light forms image on the image sensor 12 across the point between the point PT5 and the point PT6.

Thus, all of the portions contributing for formation of image of the incident light of the lens 53 go to the lens 83. High efficiency of use of the light can be achieved so that the brightness of the image formed on the image sensor 12 becomes uniform. It should be noted that, for establishing such optical system, it becomes necessary that the reduction ratio in the intermediate image is less than one half. In view point of efficient utilization of the light, it is desirable that the reduction ratio at the intermediate image is less than or equal to approximately one quarter. In the shown embodiment, the reduction ratio of the intermediate image is set at one quarter.

As set forth above, since the first shielding film 38 with apertures 71, 72, 73, ... having the opening diameter times of the reduction ratio with respect to the lens pitch is arranged at the position of the image plane of the reduced image formed by lens 51, 52, 53, ..., overlapping between reversed real images formed by respective of individual lens 51, 52, 53, ... can be successfully prevented.

It should be noted that the first light shielding film 38 is not necessary to be precisely positioned at the position of the image plain of the reduced image but is required to be placed in the vicinity of the image plain of the reduced image. Here, as the position in the vicinity of the image plain, it may be permissible to place the light shielding film 38 at the position ±100 μm of the image plain of the reduced real image in reversed function.

On the other hand, since the second light shielding film 34 is provided between the lens 51, 52, 53, ... and the first light shielding film 38, the images formed by the lens 51, 52, 53, ... are prevented from forming image at the adjacent openings of the apertures 71, 72, 73, . . . of the first light shielding film 38. Thus, erected equal magnification image with no crosstalk can be obtained.

Even when the intermediate lens are not placed at the positions of the apertures 71, 72, 73, . . . , the reduced intermediate images are formed at the position of the apertures 71, 72, 73, . . . . Therefore, all of the effective component of the incident light for the lens 51, 52, 53, . . . of the lens array 50 can be introduced to the lens 81, 82, 83, . . . of the second lens array 80. Thus, efficiency of use of the light may not be lowered.

Second Embodiment

Next, discussion will be given for an example of the optical apparatus 22, in which binary lens as one type of Fresnel lens are employed as the lens 51, 52, 53, . . . and the lens 81, 82, 83, . . . .

Figure 4:
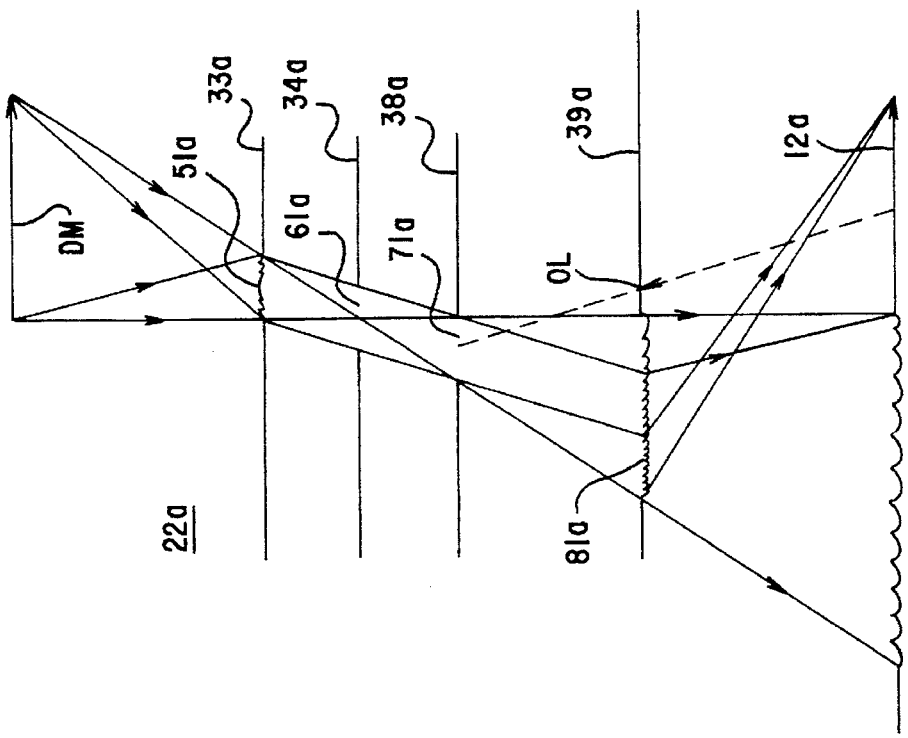
FIG. 4 is a partially sectioned illustration showing the optical apparatus according to the present invention which employs a binary lens.

FIG. 4 is a partially sectioned illustration showing the optical apparatus 22 of the present invention, employing the binary lens.

In FIG. 4, light shielding films 33a, 34a, 38a and 39a are adapted to block external light and prevent internal reflection of light. Lens 51a (lens 51a, 52a, 53a, . . . ) and lens 81a (lens 81a, 82a, 83a, . . . ) are binary lens. Among Fresnel lens, the diffraction type Fresnel lens is the lens where a portion providing an optical path difference of integer multiple of a wavelength not affecting for focusing effect of the lens, is removed from a normal dioptic type lens. In contrast, the binary lens is a lens where the surface configuration of the diffraction type Fresnel lens is approximated to a step form configuration. The binary lens is easy in controlling the configuration. But since the binary lens is a diffraction type, lowering of contrast by a light passing across in straight, i.e. non-diffraction light is more important problem than crosstalk.

Therefore, a large offset is provided between a center of the opening portion of the lens 81a and an optical center OL to place the optical center OL outside of the outer edge of the opening portion. On the other hand, the optical center of the lens 51a and the optical center of the lens 81a are arranged to be substantially in opposition to each other. As a result, the opening portion of the lens 81a is placed with offset relative to the opening portion of the lens 51a. By this, while the real image by the lens 81a is formed on the image sensor 12a at the location on the axis connecting the optical centers of two lens. However, since the non-diffraction light will never reach the image sensor 12a so that the contrast of the real image formed on the image sensor 12a can be enhanced.

On the other hand, as required, it is possible to further enhance contrast by offsetting the optical center of the lens 51a from the center of the opening portion.

By employing the binary lens as set forth above, preparation of the mold becomes easy to permit lowering of cost by mass-production. Namely, while the three-dimensionally shaped lens, such as the rod lens array is difficult to produce, since the binary lens to be employed in the shown embodiment of the invention is formed by combining planar elements, production is relatively easy to make mass-production easier. The production process of the binary lens to be employed in the present invention will be discussed later.

In the embodiment set forth above, since the first substrate 31 and the second substrate 36 are prepared and fixed to each other by bond via a spacer plate 35, formation, arrangement and the position of the second light shielding film 34 and the first light shielding film 38 becomes easy to facilitate production of the optical apparatus 22.

The construction of the substrates can be modified in various fashion. For instance, the substrates may consist of the first substrate, on which the first lens array 50 and the light shielding film 33 are formed at one surface of the first substrate, on which the second lens array 80 and the light shielding film 39 are formed at one surface of the second substrate and the other substrate, on which the first light shielding film 38 and the second light shielding film 34 are formed at each surface of the other substrate. Therefore, the optical apparatus can be formed by integrating the first substrates, the second substrates, and the other substrate by the bond.

In the embodiment set forth above, the second light shielding film 34 is desired to be placed in the vicinity of the intermediate position between the first lens array 50 and the first light shielding film 38. According to displacing of the second light shielding film 34 away from the intermediate position, the crosstalk prevention effect can be reduced. The constants such as opening diameter of each lens, the pitch of the lens and so forth may be determined so as not to interfere for formation of the image.

In the foregoing embodiment, it is possible to arrange the lens at the positions of the apertures 71, 72, 73, . . . of the first light shielding film 38 to form a third lens array. In this case, by making the reduction ratio by the first lens array smaller (make closer to 1), an amount of light to be captured is increased to increase brightness of the image. On the other hand, by providing the third lens array, diffusion of light at the discharge side can be suppressed. Accordingly, by making the opening diameter of the lens 81, 82, 83, . . . smaller, efficiency of use of the light can be further improved to further reduce fluctuation of brightness of the image.

Third Embodiment

Next, discussion will be given for the embodiment of the optical apparatus 22b, in the case where the thicknesses of the first substrate 31, the spacer plate 35 and the second substrate 36 are substantially equal to each other.

FIG. 5 is a partially sectioned illustration of the optical apparatus 22b.

All of the thicknesses of the first substrate 31b, the spacer plate 35b and the second substrate 36b are 500 µm.

Each lens 51b, 52b, 53b, . . . of a first lens array 50b is the binary lens having rectangular opening of the same configuration to the light transmitting portion of the light shielding film 33b. The opening width of the lens in the row direction of the lens array is 135 µm, in the transverse direction is 102 µm. On the other hand, the focal distance within the matrix 32 is 607 µm, and the pitch between the lens is 545 µm.

Each lens 81b, 82b, 83b, . . . of a second lens array 80b is the binary lens having rectangular opening of the same configuration to the light transmitting portion of the light shielding film 39b. The opening width of the lens in the row direction of the lens array is 256 µm, in the transverse direction is 192 µm. On the other hand, the focal distance and the pitch between the lens are the same as those of respective lens 51b, 52b, 53b, . . . of the first lens array 50b.

In the second light shielding film 34b, rectangular apertures 61b, 62b, 63b, . . . of 215 µm in the row direction and 500 µm in the transverse direction are formed at the positions opposing to respective lens 51b, 52b, 53b, . . . for passing the discharged lights from the lens 51b, 52b, 53b, . . .

On the other hand, in the first light shielding film 38b, rectangular apertures 71b, 72b, 73b, . . . of 255 µm in the row direction and 500 μm in the transverse direction are formed in opposition to respective lens 51b, 52b, 53b, . . . for passing the discharged light from the apertures 61b, 62b, 63b, . . . of the second light shielding film 34b.

Employing the optical apparatus 22b constructed as set forth above, when the original DM is arranged at a distance of 2.2 mm from the optical apparatus 22b, the reversed real image reduced into 0.235 times of the image of the original DM is formed in the vicinity of intermediate position between the first light shielding film 38b and the second light shielding film 34b.

The reversed real image formed in the vicinity of the intermediate position between the first light shielding film 38b and the second light shielding film 34b is then formed as a erected real image on the image sensor 12 by further passing the lens 81b, 82b, 83b, . . . . At this time, a distance between the lens 81b, 82b, 83b, . . . and the image sensor 12 is 2.2 mm, and the image is expanded into the original size by the lens 81b, 82b, 83b, . . . , the erected real image of equal magnification to that of the original is formed on the image sensor 12.

The apertures 61b, 62b, 63b, . . . and the apertures 71b, 72b, 73b, . . . do not interfere the light path from respective lens 51b, 52b, 53b to the lens 81b, 82b, 83b, . . . . Therefore, the image formed by each lens has a width of 832 μm derived by dividing an average value (195.5 μm) of the opening width of 135 μm of the first lens and the opening width of 256 μm of the second lens by magnification (0.235) of the intermediate image. Since the pitch of the lens is 545 μm, the image formed by respective lens may overlap in the row direction. Here, the luminance of the image by each lens is gradually lowered toward the circumferential portion of the image. Therefore, variation of luminance of the composite image in the row direction becomes small to smoothly overlap the images.

Particularly, in the embodiment set forth above, by the light shielding film 39b, the opening width (256 μm) in the row direction of the lens 81b, 82b, 83b . . . of the second lens array 80b is double of the product of the pitch (545 μm) of the lens array and the reduction ratio (0.235) of the intermediate image, the brightness of the overlapping image becomes uniform.

Here, the fact that the brightness of the overlapped image is uniform, will be discussed with reference to FIG. 6.

Figure 6A:
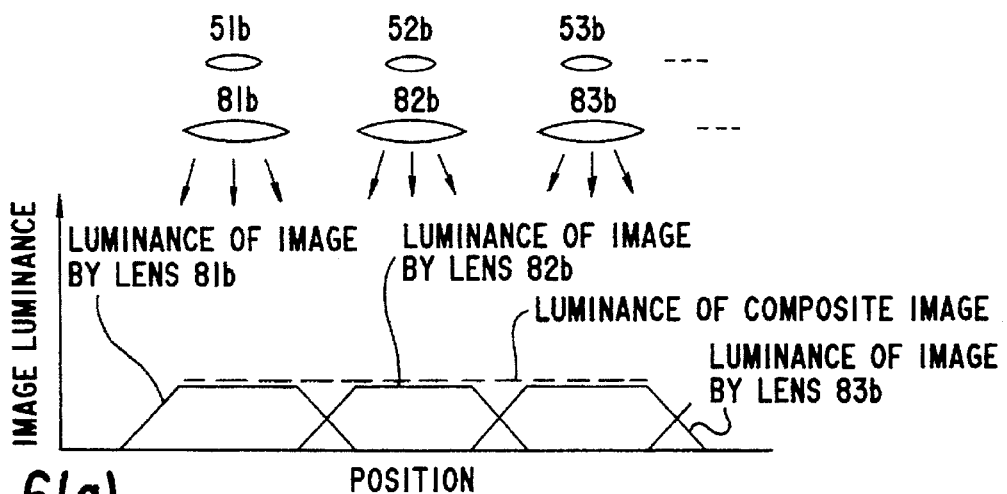
FIG. 6 is an illustration showing a brightness distribution in an image formed by the optical apparatus of FIG. 5.
Figure 6B:
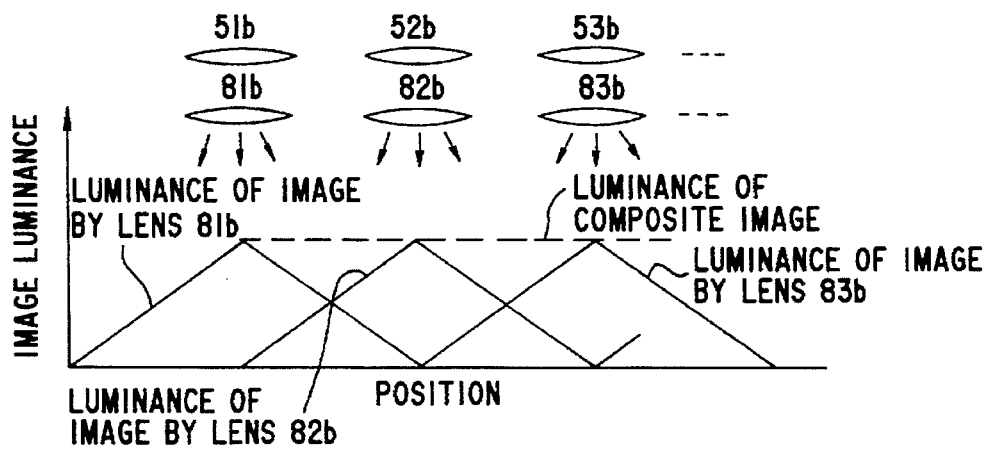
Figure 6C:
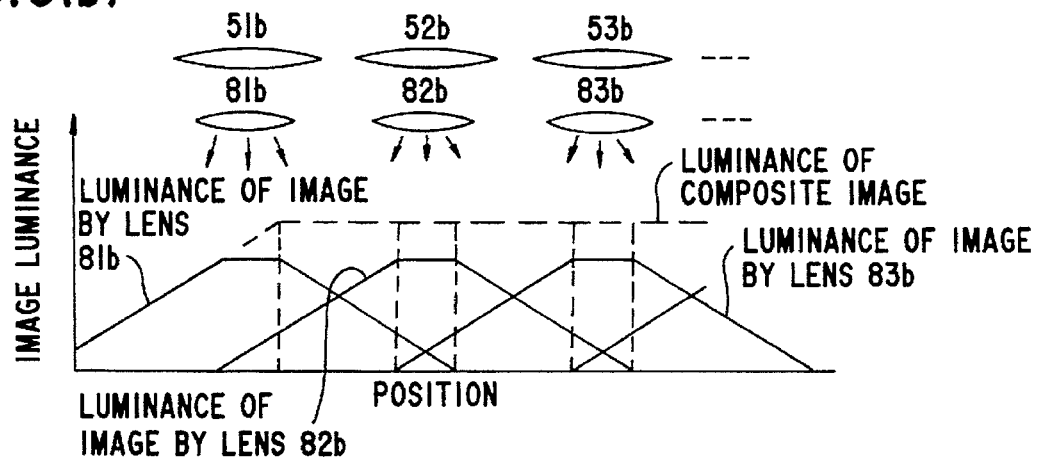

FIG. 6 shows the luminance distribution of the image formed by respective lens 81b, 82b, 83b, . . . calculated, when the opening width in the row direction of the lens 81b, 82b, 83b, . . . of the second lens array 80b is double of the product of the pitch of the lens array and the reduction ratio of the intermediate image.

The luminance of the image formed by respective lens becomes higher at the center and lower toward the circumference. The shape of the luminance distribution in the row direction of the image by respective lens is varied in three kinds of patterns as shown depending upon which is greater between the width of the openings in row direction of the lens 51b, 52b, 53b, . . . of the first lens array 50b and the width of the openings in row direction of the lens 81b, 82b, 83b, . . . of the second lens array 80b. In either case, it should be appreciated that the luminance of the overlapping image becomes uniform value irrespective of the position in the row direction.

Thus, the fact that the luminance of the composite image becomes uniform in the row direction when the opening width of either one of the lens array is even number of times of the product of the pitch and the reduction ratio of the intermediate image, can be attained through the similar calculation.

In the foregoing embodiment, since each lens in the lens array have rectangular shape, the luminance distribution in the row direction of the lens array and the luminance distribution in the transverse direction are derived independently of each other.

Concerning luminance distribution in the transverse direction to the row, it has an uniform width in the vicinity of the center at a value of $|h1-h2|/(2r)$ which is derived by dividing an absolute value of a half of a difference between the width (h1) of the opening in the transverse direction of each lens 51b, 52b, 53b, . . . of the first lens array 50b and the width (h2) of the opening in the transverse direction of each lens 81b, 82b, 83b, . . . of the second lend array 80b, by the reduction ratio (r) of the intermediate image.

Accordingly, in the embodiment set forth above, the luminance is uniform in the region of 191 μm ($=|102-192|/(2\times 0.235)$) in the vicinity of the center. At the outer side of the central region, the luminance is gradually lowered toward the outer circumference.

As set forth above, the image of the original DM obtained by the optical apparatus 22b has uniform luminance in the row direction in a width of 191 μm. Accordingly, the image having no fluctuation in the brightness and thus have uniform brightness can be attained.

On the other hand, in the foregoing embodiment, since the width of the aperture of the light shielding film is wider than the width of the optical path from each lens 51b, 52b, 53b, . . . to each lens 81b, 82b, 83b, . . . in the extend of approximately 40 μm, tolerance in precision of positioning of the lens array and the light shielding film in ±20 μm can be certainly provided.

Fourth Embodiment

Next, discussion will be given for the embodiment of the optical apparatus 22c, in which the first lens array 50 and the second lens array 80 are respectively formed with two rows of lens.

Figure 7:
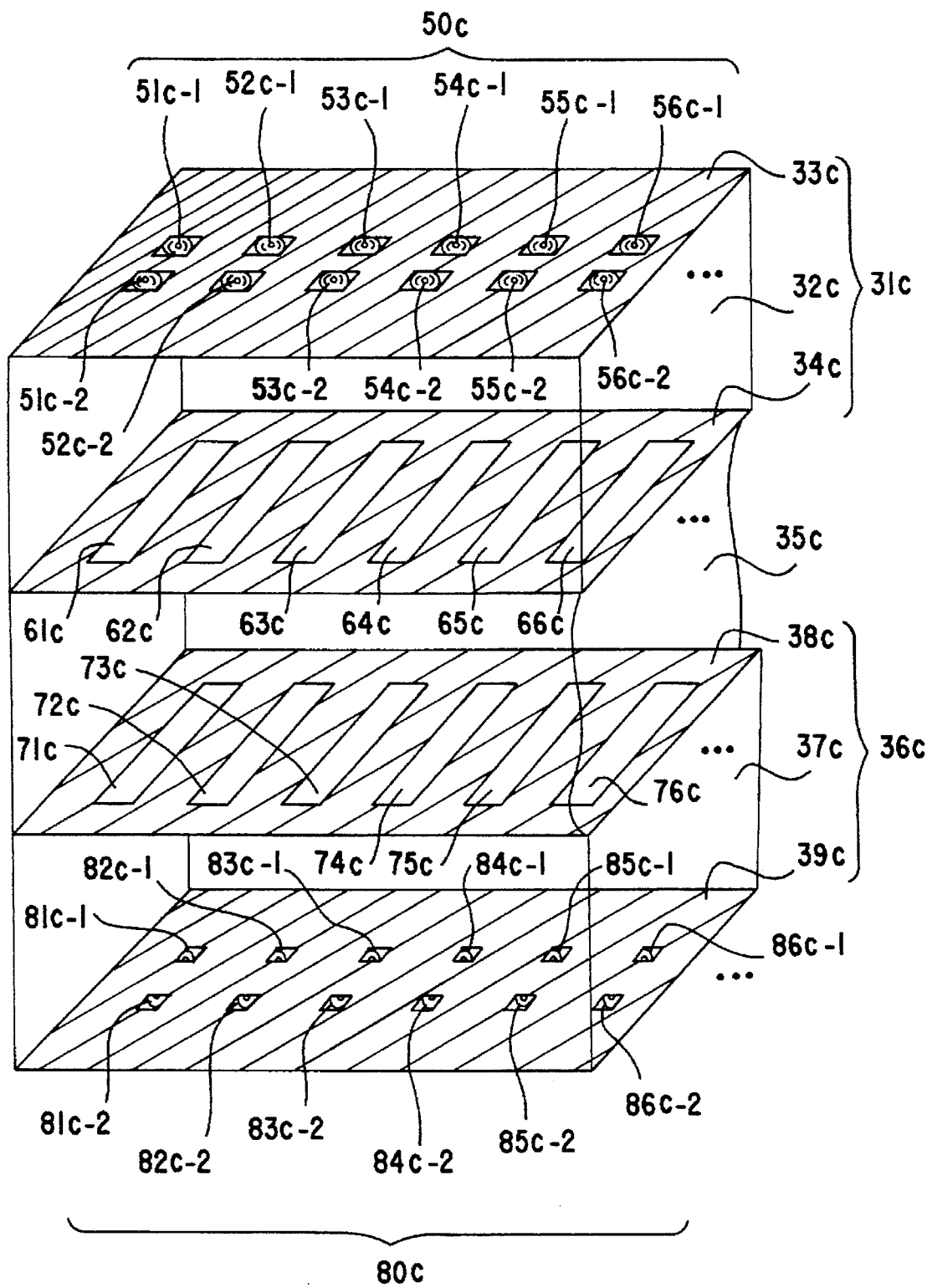
FIG. 7 is an illustration showing a further embodiment of the optical apparatus according to the present invention.

FIG. 7 is an illustration showing configuration and arrangement of the lens arrays 50c and 80c and light shielding films 34c and 38c. FIG. 9 is a partially enlarged illustration showing a layout of the lens arrays 50c and 80c.

All of the thicknesses of a first substrate 31c, spacer plate 35c and a second substrate 36c are 500 μm similarly to the foregoing embodiment.

The first lens array 50c is consisted of lens 51c-1, 52c-1, 53c-1, . . . and 51c-2, 52c-2, 53c-2, . . . . Each lens 51c-1, 52c-1, 53c-1, . . . and 51c-2, 52c-2, 53c-2, . . . is the binary lens having rectangular opening of the identical configuration defined by a light shielding film 33c. The width of the opening is 262 μm in the row direction of the lens array and 183 μm in the transverse direction transverse to the row direction. Focal distance of each lens 51c-1, 52c-1, 53c-1, . . . and 51c-2, 52c-2, 53c-2, . . . is 607 μm in the matrix 32c, and the pitch b1 between the lens is 558 μm. The optical centers of respective lens 51c-1, 52c-1, 53c-1, . . . and 51c-2, 52c-2, 53c-2, . . . are coincident with the centers of the rectangular opening. The center-to-center distance a1 between two rows is 558 μm which is same as the pitch b1.

The second lens array 80c is also consisted of lens 81c-1, 82c-1, 83c-1, . . . and 81c-2, 82c-2, 83c-2, . . . . All of the lens 81c-1, 82c-1, 83c-1, . . . and 81c-2, 82c-2, 83c-2, . . . are binary lens defined rectangular openings of identical configuration by a light shielding film 39c. The width of the opening is 183 μm in the row direction and 131 μm in the transverse direction. The focal distance and the pitch b2 between the lens are the same as those of the first lens array. It should be noted that the centers of the opening portions are offset from the optical centers. In the shown embodiment, the optical centers are positioned at the centers of inner edges of two rows of rectangular openings. The center-to-center distance a2 if two rows of lens is 558 μm which is the same as that of the pitch b2.

In the second light shielding film 34c, with taking transversely aligned two lens of lens 51c-1, 52c-1, 53c-1, . . . and 51c-2, 52c-2, 53c-2, . . . as one set, rectangular apertures 61c, 62c, 63c, . . . of 275 μm in the row direction and 1000 μm in the transverse direction transverse to the row direction are formed at the positions opposing to respective sets of the lens 51c-1, 52c-1, 53c-1, . . . and 51c-2, 52c-2, 53c-2, . . . , for passing discharged light from the lens 51c-1, 52c-1, 53c-1, . . . and 51c-2, 52c-2, 53c-2, . . . .

On the other hand, in the first light shielding film 38c, rectangular apertures 71c, 72c, 73c, . . . of 249 μm in the row direction and 1000 μm in the transverse direction are formed at the positions opposing to respective sets of lens 51c-1, 52c-i, 53c-1, . . . and 51c-2, 52c-2, 53c-2 , . . . , for passing discharge lights from the rectangular apertures 61c, 62c, 63c, . . . of the second light shielding film 34c.

Figure 8:
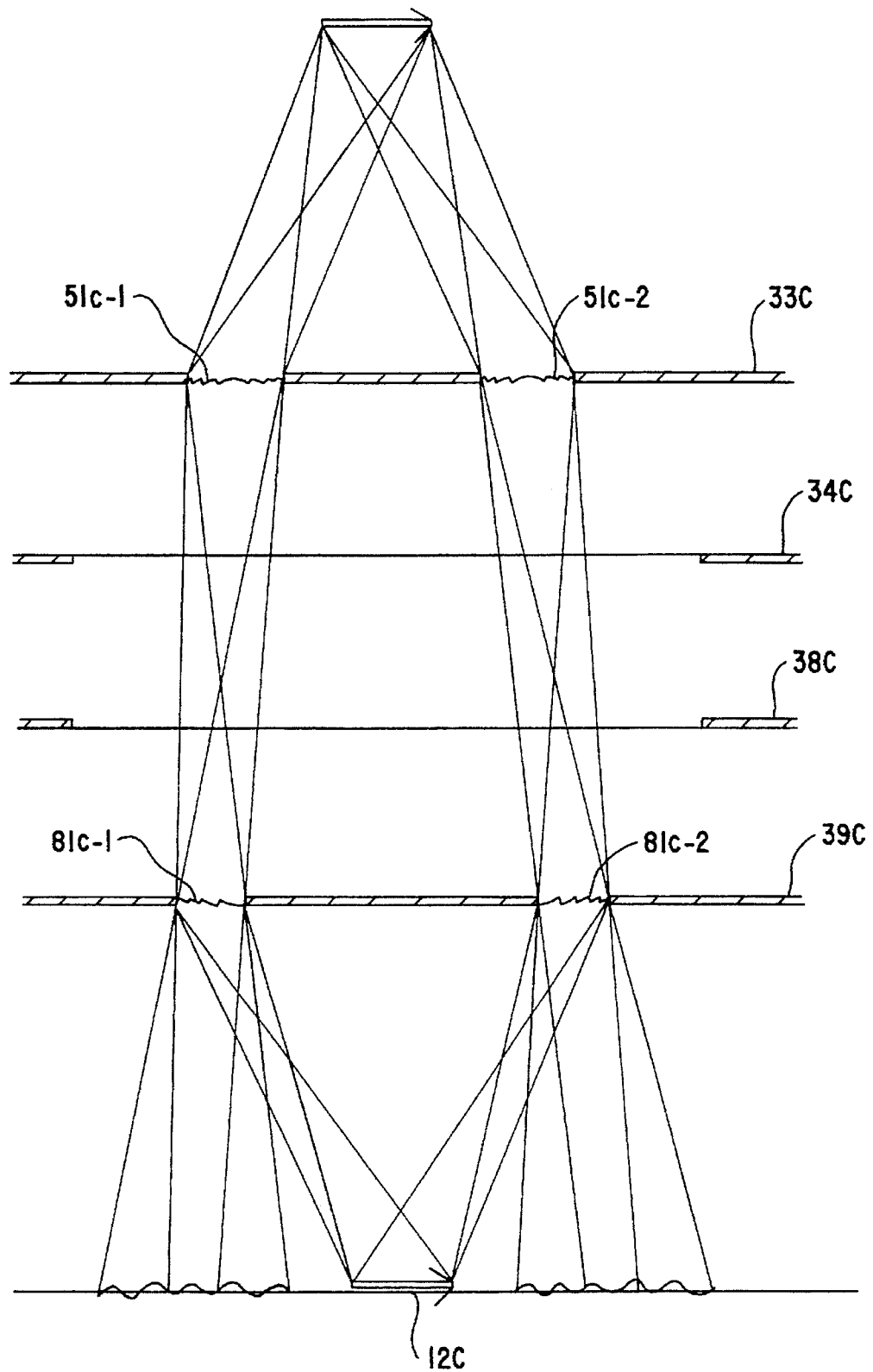
FIG. 8 is a partially sectioned illustration of the optical apparatus of FIG. 7.

FIG. 8 is a partially sectioned illustration of the above-mentioned optical apparatus 22c.

Since the optical center of the lens lies on the inner edges of the opening portions of the lens 81c-1 and 81c-2, the non-diffracted light is offset outside. Then, the real image is formed on the image sensor 12c located at equal distance to the lens 81c-1 and 81c-2. The luminance of the images formed by respective lens 81c-1 and 81c-2 are lowered at greater distance from the lens. However, by composing two images formed by the lens 81c-1 and 81c-2, lowering of luminance at the intermediate position can be avoided and thus a region of uniform luminance distribution can be certainly established.

It should be noted that since the configuration of the aperture is in slit-form configuration, the light from the lens 51c-1 (51c-2) incides to the lens 81c-2 (81c-1) to form unnecessary image. However, since this image is formed at the position sufficiently distanced from the image sensor 12c, it may not affect for contrast of the image formed on the image sensor 12.

In the embodiment set forth above, the configuration, dimension, position, material, number and so forth of the first lens array 50, the first light shielding film 38, the second light shielding film 34, the second lens array 80 and so forth as well as the configuration, dimension and so forth of the first substrate 31, the second substrate 36, the spacer plate 35 or the overall construction of the optical apparatus 22 or the image reading apparatus 1 may be modified in various fashion along the principle of the present invention.

Fifth Embodiment

While the former embodiments employs two light shielding films, i.e. the first light shielding film 38 and the second light shielding film 34, as the light shielding film, it is possible to replace them with a single light shielding film.

Figure 11:
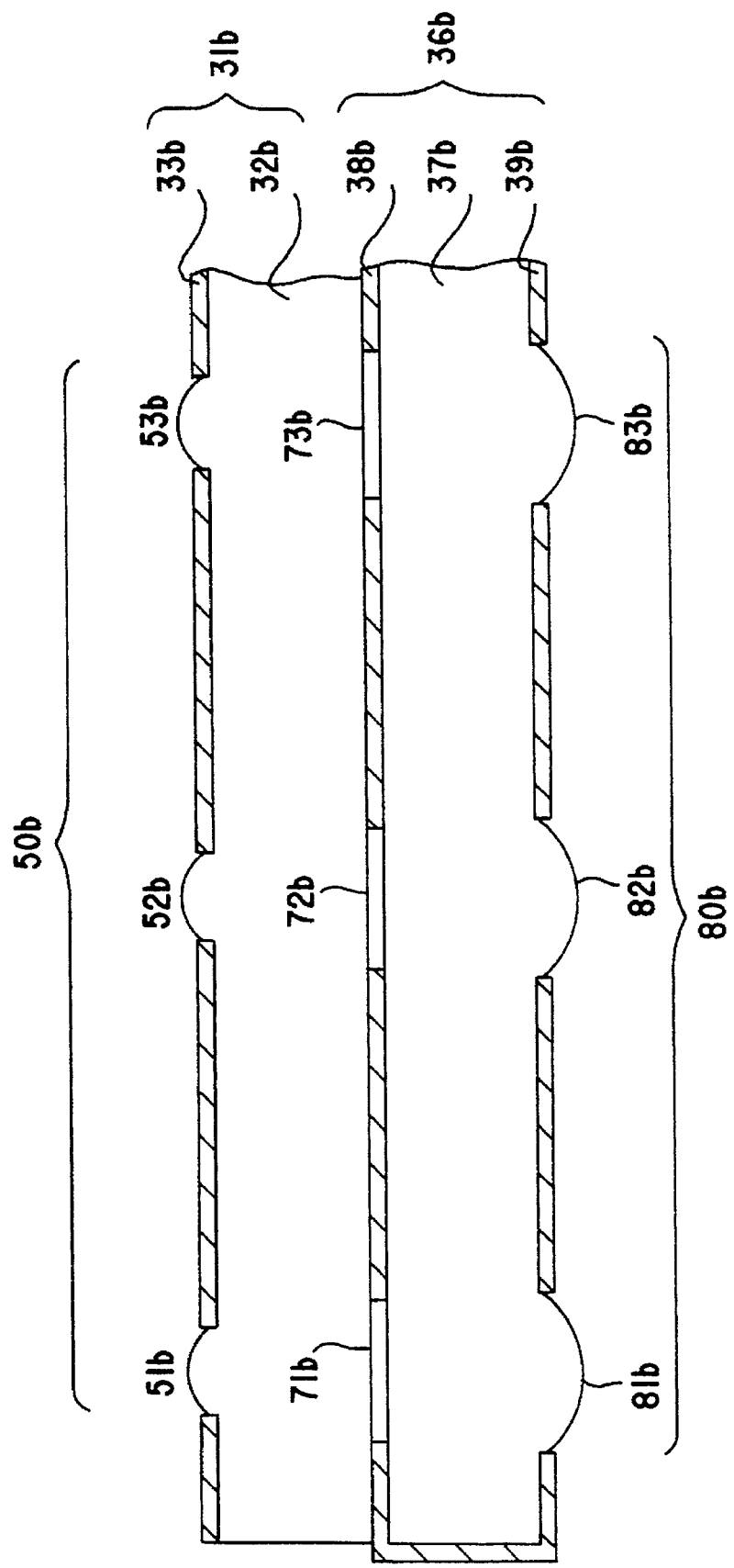
FIG. 11 is an illustration showing a construction of the embodiment where a light shielding film is single in the optical apparatus according to the present invention.
Figure 13A:
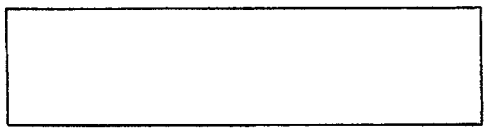
FIGS. 13(A) to 13(H) are illustrations showing a production process of the binary lens to be employed in the optical apparatus of the present invention.
Figure 13B:
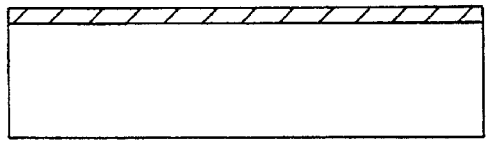
Figure 13C:
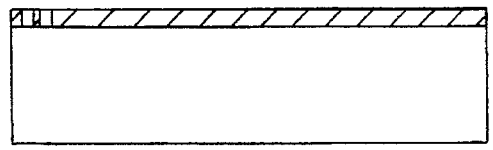
Figure 13D:
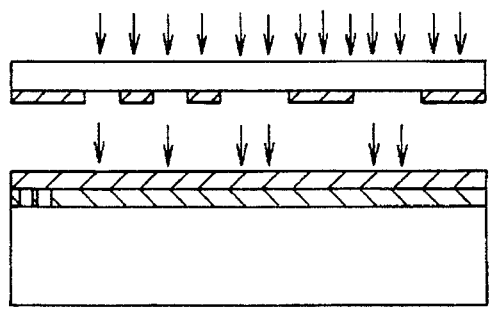
Figure 13E:
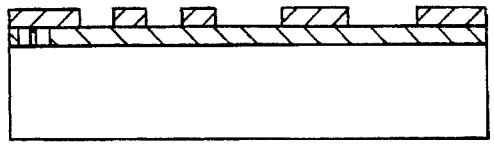
Figure 13F:
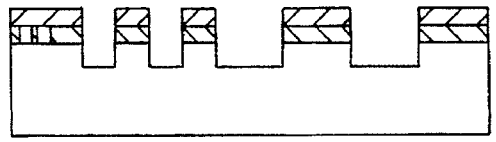
Figure 13G:
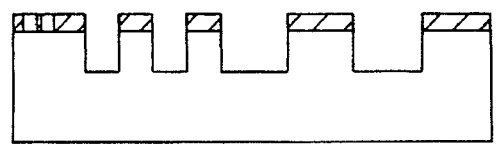
Figure 13H:
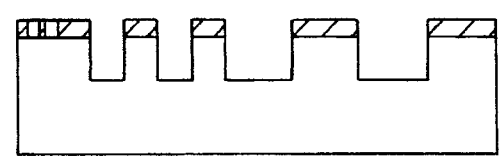

The embodiment of the optical apparatus employing the single light shielding film is shown in FIGS. 11 and 12.

FIG. 11 is a partially sectioned illustration of the embodiment of the optical apparatus, in which the thicknesses of the first substrate 31 and the second substrate 36 are substantially the same.

In FIG. 11, both of the thicknesses of the first substrate 31b and the second substrate 36b are 500 μm.

Each lens 51b, 52b, 53b, . . . of a first lens array 50b is the binary lens having rectangular opening of the same configuration to the light transmitting portion of the light shielding film 33b. The opening width of the lens in the row direction of the lens array is 100 μm, in the transverse direction is 75 μm. On the other hand, the focal distance is 429 μm within the matrix 32b and the pitch between the lens is 550 μm.

Also, each lens 81b, 82b, 83b, . . . of a second lens array 80b is the binary lens having rectangular opening of the same configuration to the light transmitting portion of the light shielding film 39b. The opening width of the lens in the row direction of the lens array is 181 μm, in the transverse direction is 138 μm. On the other hand, the focal distance and the pitch between the lens are the same as those of the lens 51b, 52b, 53b, . . . of the first lens array 50b.

In the first light shielding film 38b, rectangular apertures 71b, 72b, 73b, . . . of 180 μm in the row direction and 500 μm in the transverse direction are formed in opposition to respective lens 51b, 52b, 53b, . . . for passing the discharged light from the lens 51b, 52b, 53b, . . . .

Employing the optical apparatus 22b constructed as set forth above, when the original DM is arranged at a distance of 2.1 mm from the optical apparatus 22b, the reversed real image reduced into 0.165 times of the image of the original DM is formed in the vicinity of intermediate position between the first lens array 50b and the second lens array 80b, by the lens 51b, 52b, 53b, . . . , as shown in FIG. 1.

The reversed real image formed in the vicinity of the intermediate position between the first lens array 50b and the second lens array 80b is then formed as an erected real image on the image sensor 12 by further passing the lens 81b, 82b, 83b, . . . . At this time, a distance between the lens 81b, 82b, 83b, . . . and the image sensor 12 is 2.1 mm, and the image is expanded into the original size by the lens 81b, 82b, 83b, . . . , the erected image of equal magnification to that of the original DM is formed on the image sensor 12.

The apertures 71b, 72b, 73b, . . . do not interfere the light path from respective lens 51b, 52b, 53b, . . . to the lens 81b, 82b, 83b, . . . . Therefore, the image formed by each lens has a width of 852 μm derived by dividing an average value (140.5 μm) of the opening width of 100 μm of the first lens and the opening width of 181 μm of the second lens by magnification (0.165) of the intermediate image. Since the pitch of the lens is 550 μm, the image formed by respective lens may overlap in the row direction. Here, the luminance of the image by each lens is gradually lowered toward the circumferential portion of the image. Therefore, variation of luminance of the composite image in the row direction becomes small to smoothly overlap the images.

Particularly, in the embodiment set forth above, by the light shielding film 39b, the opening width in the row direction of the lens 81b, 82b, 83b . . . of the second lens array 80b is double of the product of the pitch of the lens array and the reduction ratio of the intermediate image, the brightness of the overlapping image becomes uniform.

FIG. 12 shows the optical apparatus having a construction where the second light shielding film is removed from the optical apparatus discussed with respect to FIG. 2.

In this embodiment, the first lens array 50 is formed on the upper surface of the first substrate 32 and the second lens array 80 is formed on the lower surface of the second substrate 37. Also, on the upper surface of the second substrate 37, the light shielding film 38 is formed. The thickness of the overall optical apparatus including the first substrate 31 and the second substrate 32 can be approximately 1.35 mm. Accordingly, the optical apparatus according to the present invention can be made more compact.

Here, the opening diameter of each lens 51, 52, 53, ... of the first lens array 50 is 100 μm, the focal distance thereof is 360 μm. The opening diameter of the lens 81, 82, 83, ... of the second lens array 80 is 325 μm and the focal distance thereof is 720 μm. The pitch between respective lens is 500 μm.

On the other hand, the apertures 71, 72, 73, ... of the first light shielding film 38 are located in opposition to the lens 51, 52, 53, ..., and the opening diameter thereof is 125 μm.

Employing the optical apparatus constructed as set forth above, when the original DM is placed at a distance of 1.2 mm from the optical apparatus, the reversed real image reduced into one quarter can be formed in the vicinity of the light shielding film 38. Namely, the real image is formed in the vicinity of each apertures 71, 72, 73, ....

In case of the shown embodiment, by each lens of the second lens array, the erected image of equal magnification to the original DM is formed on the image sensor 12 placed at a position distanced from the lower surface in a magnitude of 2.4 mm.

As set forth above, when the optical apparatus comprises a single light shielding film, either of crosstalk preventing effect or efficiency in use of light should be sacrificed. However, since it can be constructed with only two substrates, it is advantageous in viewpoint of the cost.

It should be noted that the foregoing embodiment shows the case where one or two light shielding films are formed on the surface where the lens are not provided. However, the invention is not necessary to be specified to the shown construction. For example, it is possible to form the optical apparatus with the three or more light shielding films. Such construction is not advantageous in viewpoint of down sizing, but advantageous in prevention of crosstalk and improvement in efficiency of use of the light can be achieved.

Sixth Embodiment (Binary Lens and Light Shielding Film Production Process)

Next, discussion will be given for the process in production of the binary lens to be employed in the present invention with making reference to FIGS. 13(A) to 13(H), 14(A) to 14(H), 15(A) to 15(F) and 16(A) to 16(F). FIG. 13(A) to FIG. 14(H) are the process steps in production of the lens and FIG. 15(A) to FIG. 16(F) are the process steps in formation of the light shielding film.

1) At first, the substrate for forming the lens and the light shielding film is washed by a normally used washing liquid. The drawings show section of the substrate. As the substrate, a circular quartz substrate of 76 mm diameter is employed. (FIG. 13(A))

From this quartz substrate, given number of rows, in each of which a plurality of binary lens are arranged in alignment, are formed.

2) Since the quartz substrate is transparent, a titanium (Ti) is deposited in a thickness of 500 Å on one side surface as a metal for identifying the position of the surface of the substrate. (FIG. 13(B))

3) At a portion on the end of the substrate, a reference point, i.e. marker, is formed by etching for determining positions of subsequently formed lens and light shielding film. The drawings to be used for the following discussion is an enlarged illustration showing only part of one binary lens. (FIG. 13(C))

4) In order to form a lens pattern on the quarts substrate, application of resist, pre-baking and exposure are performed in this order. As the resist, THMR-ip3000-15CP from Tokyo Oka K. K. may be used, for example.

The resist application process is performed with rotating the substrate at a speed of 4000 r.p.m.

The pre-baking process is performed for drying the resist by maintaining the substrate at a temperature of 90° C. for 90 sec.

In the subsequent exposure process, with employing a mask plate having a desired lens pattern, reducing projectile exposure is performed for 400 msec. (FIG. 13(D))

5) In order to remove resist from the exposed position, processes of PEB (Post Exposure Baking), development and post-baking are performed in this order.

In the PEB process, the substrate is maintained at 110° C. for 90 sec.

In the development process, using NMD-W from Tokyo Oka K. K. as developer, development is performed for removing the resist.

In the post-baking process, the substrate is maintained at 120° C. for 20 min. to fix the remaining resist. (FIG. 13(E))

6) By RIE (Reactive Ion Etching), surface of the quartz at the position where the resist is removed, is removed.

The RIE process is performed with plasma discharge of 150 W for 12 min. with ejecting $CF_4$ of 100 sccm into the vacuum vessel. (FIG. 13(F))

7) In order to remove the resist remaining on the portion other than the portion where the quartz is removed, washing of the substrate is performed. (FIG. 13(G))

8) In order to utilize the marker at the next process, a resist for protecting the marker is formed.

Namely, protecting resist application process and baking process (90° C., 20 min.) are performed. (FIG. 13(H))

9) Titanium (Ti) at the position other than marker portion is removed by etching (5 min.) similar to the marker forming process. (FIG. 14(A))

10) Similarly to the foregoing 2), deposition of Ti on the surface of the substrate is performed. Then, for removing the protecting resist of the marker portion, washing is performed. (FIG. 14(B))

11) Similarly process to the foregoing 4) is perform with employing another masking plate. Another masking plate having a pattern to expose the position where removal of quartz to deeper level is required, is used. The conditions at respective process are the similar to those of 4). (FIG. 14(C))

12) Similar process (PEB, development, post-baking) to the foregoing 5) is performed. (FIG. 14(D))

13) In similar manner to the foregoing 6), RIE process is performed for 20 min. (FIG. 14(E))

14) In similar manner to the foregoing 7), washing for removing resist is performed. (FIG. 14(F))

15) Similarly to 8), the processes for protecting marker (protecting resist application/baking) are performed. (FIG. 14(G))

16) Similarly to the foregoing 9), process for removing titanium (Ti) is performed. (FIG. 14(H))

By this, as shown in these drawings, the binary lens having step form surface is formed. When LED of green color illumination of an image reading apparatus is employed, the height of the binary lens, namely, depth of cutting the surface of the quartz substrate is set at 0.8 μm, and the width of the step of the outermost peripheral convex of the binary lens is approximately 0.4 μm.

Figure 14A:
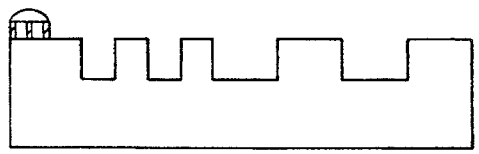
FIGS. 14(A) to 14(H) are illustrations showing a production process of the binary lens to be employed in the optical apparatus of the present invention.
Figure 14B:
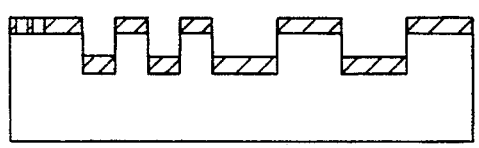
Figure 14C:
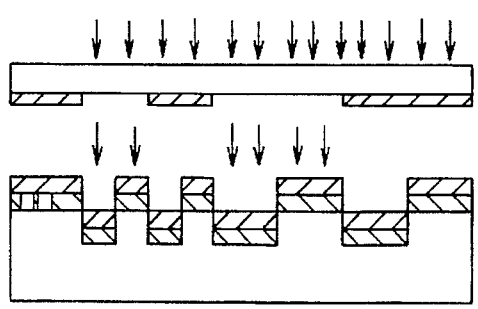
Figure 14D:
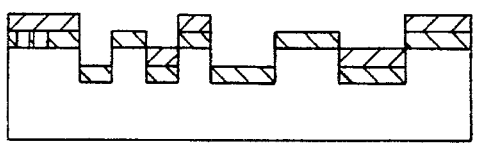
Figure 14E:
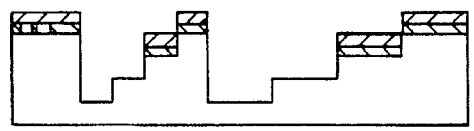
Figure 14F:
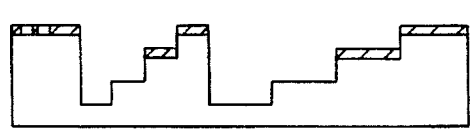
Figure 14G:
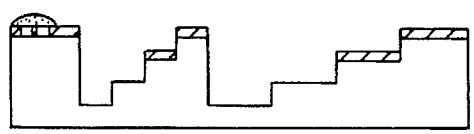
Figure 14H:
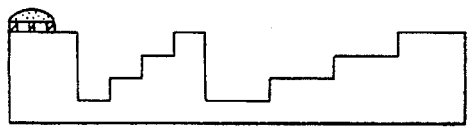
Figure 15A:
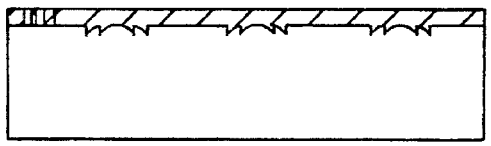
FIGS. 15(A) to 15(F) are illustration showing a process of formation of the light shielding film of the optical apparatus according to the present invention.
Figure 15B:
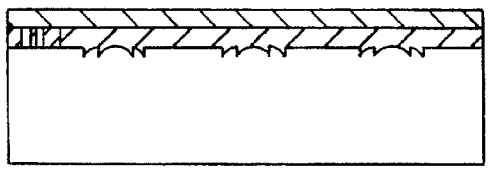
Figure 15C:
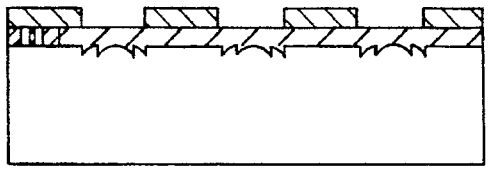
Figure 15D:
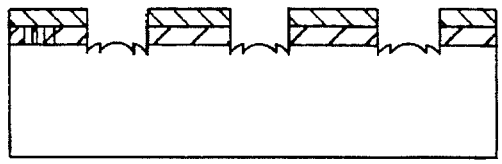
Figure 15E:
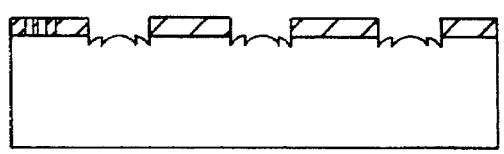
Figure 15F:
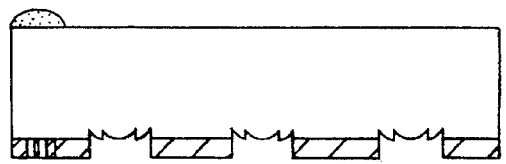
Figure 16A:
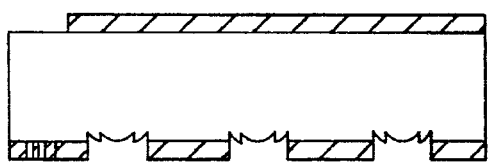
FIGS. 16(A) to 16(F) are illustration showing a process of formation of the light shielding film of the optical apparatus according to the present invention.
Figure 16B:
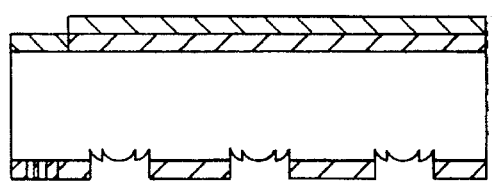
Figure 16C:
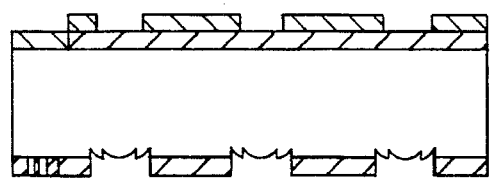
Figure 16D:
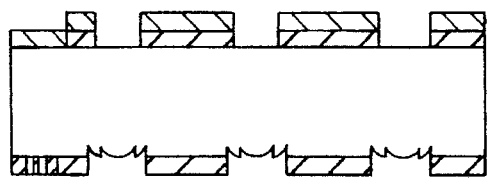
Figure 16E:
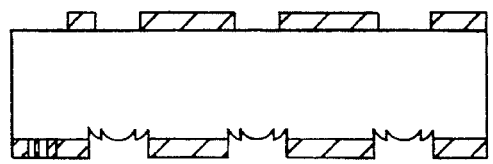
Figure 16F:
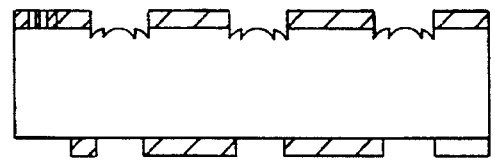

It should be noted, FIG. 14(H) illustrating the process 16) is an enlarged view showing only outermost two convex of the binary lens. In one binary lens, a plurality of such convex are formed. Accordingly, while not illustrated, through the processes of 1) to 16), a plurality of binary lens are formed on one quartz substrate.

On the other hand, at the processes of 1) to 16), it is shown that an example of formation of the surface of four level binary lens having four levels of steps through twice of lens formation process. However, when the binary number having greater number of steps is to be formed, number of cycles of the lens formation steps to perform may be increased.

Next, light shielding film formation processes 17) to 28) are shown in FIGS. 15(A) to 15(F) and 16(A) to 16(F).

Here, process steps 17) to 21) are processes for forming the light shielding film (33c, 39c of FIG. 7, for example) on the surface side of the binary lens formed through the preceding process, and the light shielding film (34c, 38c of FIG. 7, for example) on the surface opposite side whether the binary lens is not formed.

On the other hand, the sections of the quartz substrate shown in FIGS. 15(A) to 15(F), illustrates the substrate formed with three binary lens.

17) At first, with respect to the surface of the substrate at the side where the lens are formed, deposition of the light shielding film and washing of the surface are performed. (FIG. 15(A))

Here, the light shielding film is consisted of two layers, i.e., 500 Å of $Cr_2O_3$ layer and 1500 Å of Ti layer.

$Cr_2O_3$ layer is a layer contributing in absorption of a reflected light generated within the quartz substrate, and Ti layer is a layer for shielding light of the incident light to the substrate.

On the other hand, the deposition is performed by the method similar to the foregoing 2), and the washing is performed by the method similar to the foregoing 1).

18) Next, similarly to the foregoing 4), resist application and pre-baking are performed in this order. Then, the resist is applied to the surface. (FIG. 15(B))

19) Furthermore, similarly to the foregoing 4) and 5), exposure, PEB, development and post-baking are performed under same condition. Then, the resist on the lens portion is removed. (FIG. 15(C))

20) The light shielding film exposed to the glass surface, namely $Cr_2O_3$ layer and Ti layer are removed by wet etching. (FIG. 15(D))

The wet etching is performed for 15 min. with Ti etching agent and for one min. with $Cr_2O_3$ etching agent by dipping the substrate.

21) Subsequently, residual resist is removed by acetone. (FIG. 15(E))

By the foregoing process, the light shielding films (33c, 39c of FIG. 7) are formed at the surface at the side where the binary lens is formed.

22) Subsequently, through the process up to 27), the light shielding film (34c, 38c of FIG. 7) and aperture (61c to 66c, 71c to 76c) are formed on the other surface (aperture surface) where the binary lens is not formed.

At first, in order to form a window for checking the marker formed at 3) through the substrate, resist is applied to only a part of the upper portion of the marker.

Namely, application of protecting resist and baking process are performed. (FIG. 15(F))

23) Similarly to the foregoing 17), deposition of the light shielding films on the aperture surface and washing are performed. (FIG. 16(A)).

Here, the light shielding film is consisted of three layers, i.e. 500 Å of $Cr_2O_3$ layer, 1500 Å of Cr layer and 500 Å of $Cr_2O_3$ layer.

24) Similarly to the foregoing 18), application of resist and pre-baking processes are performed- Here, as the resist, ONPR830-10CP from Tokyo Oka K. K. is employed.

Application of the resist is performed with rotating the substrate at a speed of 5000 r.p.m.

Pre-baking is performed under the condition for leaving at 90° C. for 30 min. (FIG. 16(B))

25) Similarly to the foregoing 19), exposure, development and post-baking are performed in this order. Here, it is desirable that exposure is performed by contact exposure differently from exposure at 19).

The exposure condition is 3.0 sec., development condition is 80 sec., and post-backing condition is 30 min. at 120° C. (FIG. 16(C))

26) By development as set forth above, for removing the light shielding film at the exposed portion, wet etching is performed for 5 min. with Cr etching agent. (FIG. 16(D))

27) Finally, similarly to the foregoing 21), residual resist is removed. (FIG. 16(E))

As set forth above, the light shielding films (34c, 38c of FIG. 7) are formed on the aperture surface.

28) The quartz substrate completed through the foregoing processes 1) to 27) is used as 31, 36 shown in FIG. 2 or first and second substrates 31c, 36c shown in FIG. 7.

Further, when two quartz substrates and one transparent spacer plate are bonded with the adhesive agent, the optical apparatus (shown FIG. 2 or FIG. 7) according to the present invention is formed.

Through the process set forth above, the optical apparatus employing the binary lens is produced. Since such optical apparatus can be produced through similar process to a semiconductor process in fabrication of LSI, mass-production becomes possible and production becomes easier and inexpensive.

On the other hand, since the lens and the light shielding films are formed integrally, higher precision in position can be attained in comparison with the case where the separately prepared lens and the light shielding films are bonded. Thus, occurrence of defective product can be lowered.

Seventh Embodiment

Next, discussion will be given for the embodiment as application of the optical apparatus according to the present invention.

Figure 17:
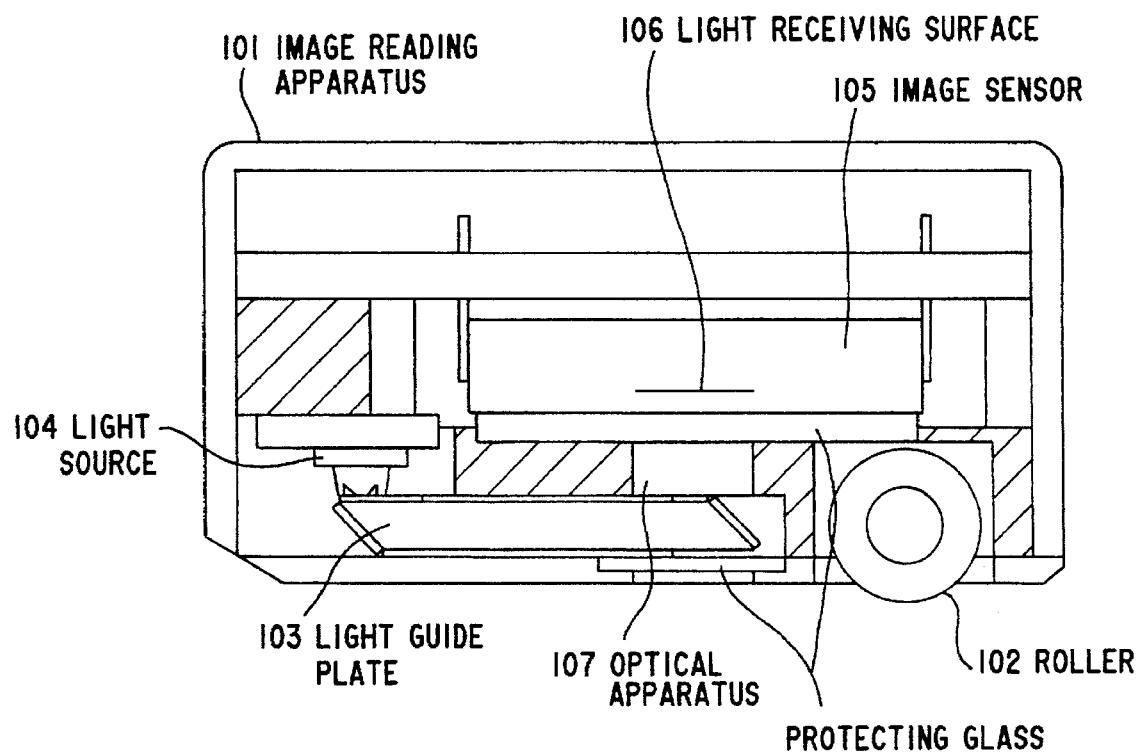
FIG. 17 us an illustration showing a construction of an image scanner as application of the present invention.

In FIG. 17, there is illustrated an image scanner as one application of the image reading apparatus.

Figure 18:
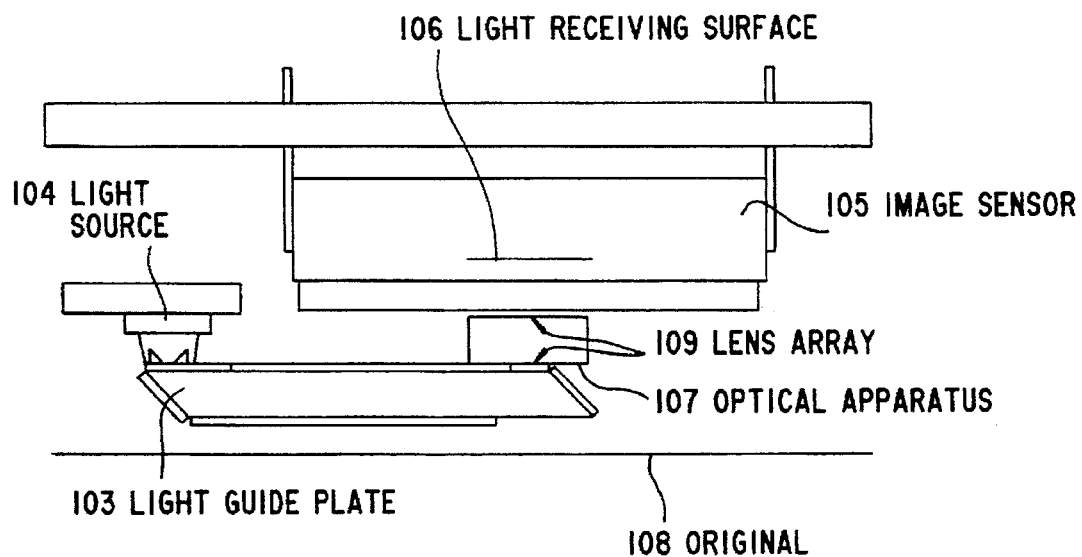
FIG. 18 is an enlarged illustration of the major portion of FIG. 17.

FIG. 18 is an enlarged sectional side elevation of the major portion of FIG. 17.

The image reading apparatus 101 has a light source 104 provided at the upper side of an original 108 for irradiating light on the original 108 to be read, overlapped two lens arrays 109 provided above the original 108, an optical apparatus 107 focusing reflected light from the original 108, a linear image sensor 105 provided above the optical apparatus 107 and perform optoelectric conversion of contrast of the real image obtained in a light receiving surface 106, and a light guide plate 103 disposed between the original 108, the light source 104 and the optical device 107 for guiding the light from the light source 104 to the original 108 for irradiation therewith.

As the optical apparatus 107, the optical apparatus according to the present invention as illustrated in FIGS. 2 or 7 may be employed.

The lens array 109 is the array, in which the foregoing binary lens are aligned.

The above-mentioned light source 104, the lens array 109, the light receiving surface 106 of the image sensor and the light guide plate 103 respectively have substantially the same longitudinal length (back and forth direction on the sheet of the drawing) with the reading width of the original 108.

The image reading apparatus 101 scans image by shifting in the transverse direction perpendicular to the array direction of the lens array 109. At this time, according to the clock provided from a control portion (not shown), the image sensor 105 converts the reflected light from the original 108 through optoelectric conversion, and the converted electric signal is stored in a storage portion (not shown).

Figure 19:
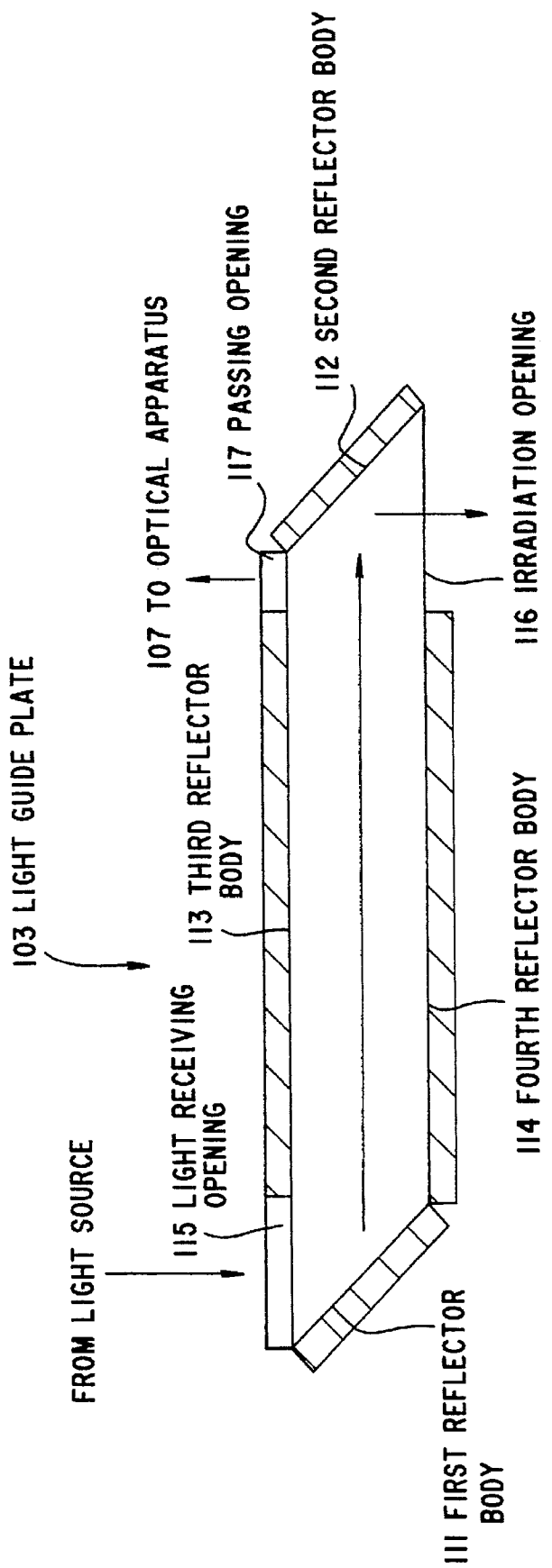
FIG. 19 is an enlarged sectional side elevation of a light guide plate of FIG. 18.

FIG. 19 is an enlarged sectional side elevation for discussion of the structure of the light guide plate. The light guide plate 103 is in parallelogram shaped configuration (thickness of 1.8 mm) in side section and flat parallelepiped transparent plastic material or glass material elongated in the longitudinal direction (back and forth direction on the sheet of the drawing). On each surface, a reflecting body is provided with orientation toward inside.

The light guide plate 103 has a light receiving opening 115 for receiving the light from the light source 104 and a passing opening 117 for passing the reflected light from the original toward the optical apparatus 107. On the side surface adjacent the light receiving opening 115, a first reflector body 111 is provided for reflecting light from the light source 104. On the side surface parallel to the first reflector body 111 is provided, a second reflector body 112 is provided for reflecting the light reflected by the reflector body 111 toward the original 108 for irradiation thereof.

On the lower surface of the light guide plate 103, a irradiation opening 116 is provided immediately below the passing opening 117 for irradiating light to the original 108 with passing the light reflected by the second reflector body 112. On the portions other than the light receiving opening 115 and the passing opening 117, a third reflector body 113 is provided so that the light reflected by the first reflector body 111 may not escape externally. Also, on the lower surface, a fourth reflector body 114 is provided at the portion other than the irradiating opening 116 so that the light reflected by the first reflector body 111 may not escape externally. Furthermore, reflector bodies are provided on the side surfaces which do not have the first and second reflector bodies 111 and 112 for blocking the light reflected by the first reflector body 111 from escaping externally.

The light from the light source 104 is received through a light receiving opening 115 provided on the upper surface of the light guide plate 103, reflected by the first and second reflector bodies 111 and 112 for deflecting the path in lateral direction, and then irradiated on the surface of the original 108 through the irradiating opening 116. The light reflected by the surface of the original 108 passes the irradiating opening 116 and the passing opening 117 provided at upper side (upper surface of the light guide plate 103) of the irradiating opening 116 to incide in the optical apparatus 107 provided at upper side of the passing opening 117.

In the optical system of the image reading apparatus constructed as set forth above, since the optical apparatus according to the present invention is used, thickness can be significantly reduced, while an image formation distance (a distance between the original 108 to the light receiving surface 106 of the image sensor) can be set to be less than or equal to 7.1 mm.

In concrete, the distance from the original 108 to the optical apparatus 107 is 3.1 mm (including the thickness of 1.0 mm of the protecting glass on the image reading surface and the thickness of 1.8 mm of the wave guide), the thickness of the optical apparatus 107 is 1.5 mm, and the distance from the optical apparatus 107 to the image sensor 105 is 2.5 mm (including the thickness of 1.0 mm of the protecting glass to the image sensor 105).

On the other hand, in general, when the image formation distance is set to be shorter, a difficulty may be encountered in assuring the position if the light source, at which the light is directly irradiated to the original. By providing the light guide plate 103 as shown between the optical apparatus 107 and the original 108, and by deflecting the path of the irradiated light from the light source 104 laterally, the irradiated light can be guided to the surface of the original 108 with maintaining the short image formation distance.

In the foregoing embodiment, while application of the optical apparatus according to the present invention to the image reading apparatus, the shown optical apparatus is also applicable as an image forming apparatus, such as image forming system of a LED printer or so forth. In such case, the LED array is arranged at the position of the original DM and a photosensitive drum is arranged at the position of the image sensor, an image corresponding to illuminating pattern of the LED array may be formed on the photosensitive drum. Thus, even when the optical apparatus 22 is applied for the image forming apparatus, compact, inexpensive and low crosstalk apparatus can be realized.

Figure 20:
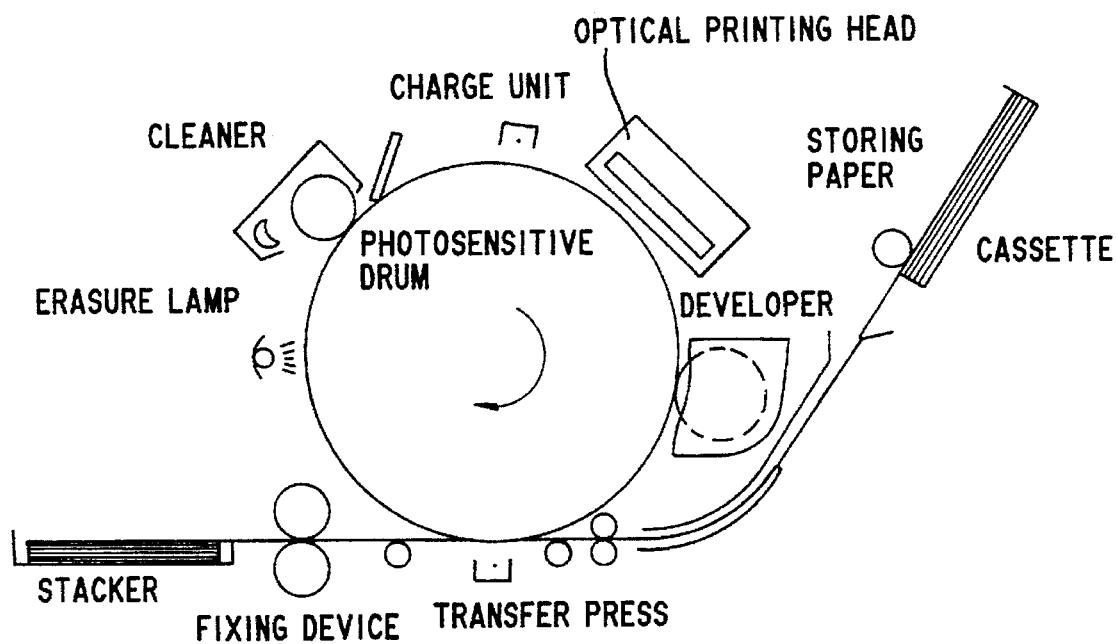
FIG. 20 is an illustration showing a construction of an optical printer utilizing the present invention.
Figure 21A:
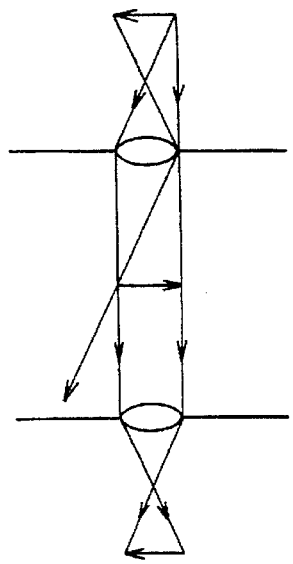
FIG. 21 is an illustration showing a construction of an optical apparatus with the conventional micro-lens array.
Figure 21B:
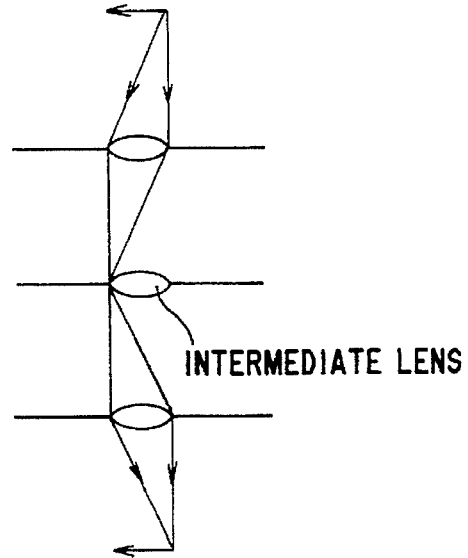

FIG. 20 shows an example, in which the optical apparatus according to the present invention is employed LED optical printer in the image forming apparatus.

As shown in FIG. 20, the LED optical printer comprises a cassette for storing paper, a transfer press, a fixing device, a stacker, a photosensitive drum, a developer, a charge unit, cleaner, erasure lamp and an optical printing head (including the LED array and the image forming lens) for forming an image to be transferred on the photosensitive drum. By employing the optical apparatus according to the present invention for the image forming lens, the optical printing head can be made smaller for down-sizing of the printer can be achieved by making the optical printing head thinner.

Further the shutter of the liquid crystal can be used instead of the LED array.

While the foregoing embodiment shows the case where an equal magnification with erected orientation is obtained, it is possible to vary the magnification of the second lens array to obtain the reduced real image smaller than the equal magnification image or to make the formed image greater.

Since the optical apparatus of the present invention has the second lens array containing a plurality of lens arranged in opposition to respective lens of the first lens array so that the erected equal magnification image can be formed from a reduced real image formed by the first lens array, and one or more light shielding films disposed between the first lens array and the second lens array and having though openings at respective positions corresponding to respective lens for passing discharged light from respective lens in the first lens array, it becomes possible to provide the optical apparatus which can minimize crosstalk, and can achieve down-sizing and lowering of cost.

Also, by constructing the optical apparatus having only one light shielding film, production of the optical apparatus is facilitated with reduced cost.

When two light shielding films are provided, since the second light shielding film is provided between the first light shielding film and the first lens array, further reduction of the crosstalk can be achieved.

Since the optical apparatus is so constructed that the light shielding film is arranged at the position on the image plane of the reduced real image formed by respective lens of the first lens array or at substantially intermediate position between the first lens array and the second lend array, crosstalk can be further reduced.

Also, since the light shielding film has through opening of the opening width which substantially not restrict the optical path from the lens of the first lens array to corresponding lens of the second lens array, but substantially block the optical path from respective lens of the first lens array to the respective lens of the second lens array adjacent to lens corresponding to the lens of the first lens array, therefore, the brightness of the formed image becomes uniform.

On the other hand, when two light shielding films are employed, since the substrate formed with the first lens array and the light shielding film on mutually opposite surfaces and the substrate formed with the second lens array and the light shielding film at mutually opposite surface, are fixed across a transparent spacer plate with mating the surfaces having light shielding films, production of the optical apparatus can be facilitated at low cost.

According to the present invention, since the first lens array and the second lens array are formed on the substrates respectively, and since the surfaces of the substrates have light shielding property except for the positions where the lens of the first and second lens arrays are provided, crosstalk can be further reduced. Since respective lens in the first and second lens arrays are aligned with a constant distance and the width in the aligning direction of at least one of the first lens array and the second lens array is even times greater than the product of its lens pitch and the reduction ratio of the reduced image formed by respective lens of the first lens array, brightness of the formed image can be made further uniform.

As set forth above, in the optical apparatus, by employing Fresnel lens or the binary lens as lens in the first and second lens arrays, mass-production becomes possible to lead further low cost.

On the other hand, when the binary lens is employed, by providing offset between the center of the configuration and the optical center, and also by placing the optical center of the lens of the second lens array on the peripheral edge of the lens contour or the outside thereof, efficiency in use of the light can be enhanced and contrast of the image can be improved.

In addition, by construction, in which the first lens array and the second lens array are two rows of lens groups arranged with equal pitch, the real images obtained from respective lens groups are composed to form one real image so as to maintain contract of the image at reasonable level. Also, the brightness of the image is improved.

Also, the optical apparatus according to the invention can reduce the size and cost of the apparatus by utilizing the image reader apparatus or the optical printer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical apparatus comprising:

a first lens array consisted of a plurality of lens to form a reduced image in reversed orientation;

a second lens array consisted of a plurality of lens, arranged at positions corresponding to respective lens in the first lens array, and forming an erected equal magnification image from the reduced image by expanding the reduced image in the given magnification; and at least one light shielding film arranged between the first lens array and the second lens array and having through openings for passing light discharged from respective lens of the first lens array at positions corresponding to respective lens of the first lens array.

2. An optical apparatus as set forth in claim 1, wherein the light shielding film is constituted of a single light shielding film which is arranged at the position of the image plane of the reduced image formed by respective lens of the first lens array.

3. An optical apparatus as set forth in claim 1, wherein the light shielding film is constituted of a single light shielding film which is arranged at substantially intermediate position between the first lens array and the second lens array.

4. An optical apparatus as set forth in claim 3, wherein the light shielding film is formed with through openings having opening width substantially not restricting an optical path from respective lens of the first lens array to corresponding lens of the second lens array, but substantially blocking the optical path from respective lens of the first lens array to the lens adjacent to the lens of the second lens array corresponding to the lens of the first lens array.

5. An optical apparatus as set forth in any one of claims 2, 3 and 4, wherein the first lens array and one light shielding film are formed on opposite surfaces of a first substrate;

the second lens array is formed on one surface of a second substrate; and the surface of the first substrate where the light shielding film is formed and the surface of the second substrate where the second lens array is not formed are fixed with mating each other.

6. An optical apparatus as set forth in claim 1, wherein the light shielding film is constituted of a first light shielding film and a second light shielding film, the second light shielding film being arranged between the first light shielding film and the first lens array.

7. An optical apparatus as set forth in claim 6, wherein the first light shielding film is arranged at the position of the image plane of the reduced image formed by respective lens of the first lens array.

8. An optical apparatus as set forth in claim 6, which is constructed such a manner that a distance between the first light shielding film and the second light shielding film, a distance between the second light shielding film and the first lens array, and a distance between the first light shielding film and the second light shielding film are substantially equal to each other.

9. An optical apparatus as set forth in claim 8, wherein the first light shielding film and the second light shielding film are formed with through openings having opening widths substantially not restricting optical paths from respective lens of the first lens array to corresponding lens of the second lens array, but substantially blocking optical paths from respective lens of the first lens array to the lens of the second lens array adjacent to the lens corresponding to the lens of the first lens array.

10. An optical apparatus as set forth in any one of claims 6, 7, 8 and 9, wherein the first lens array and the second light shielding film are formed on opposite surfaces of a first substrate;

the second lens array and the first light shielding film are formed on opposite surfaces of a second substrate; and the first and second substrates mate with the surfaces of the light shielding films with each other and fixed to of the light shielding films with each other and fixed to each other via a transparent spacer plate.

11. An optical apparatus as set forth in claim 1, wherein the first lens array and the second lens array are formed surfaces of respective substrates, and surface portions of the substrates, where the first and second lens arrays are not present, have light shielding ability.

12. An optical apparatus as set forth in claim 11, wherein respective lens of the first and second lens arrays are aligned with an equal distance, and the width in the aligning direction of respective lens of one of the first and second lens arrays is set to be even number multiple of a product of a pitch between the lens and a reduction ratio of the reduced image formed by the lens.

13. An optical apparatus as set forth in claim 12, wherein respective lens of the first and second lens arrays have rectangular shape.

14. An optical apparatus as set forth in any one of claims 1, 2, 3, 6, 7, 8, and 11, wherein each lens in the first and second lens array is Fresnel lens.

15. An optical apparatus as set forth in claim 14, wherein the Fresnel lens is a binary lens having a plurality of levels of stepped convex surfaces.

16. An optical apparatus as set forth in claim 15, wherein each lens in the second lens array has optical center offset from the center in the configuration.

17. An optical apparatus as set forth in claim 16, wherein each lens in the second lens array has the optical center placed on the outer edge of the contour of the lens or the outside thereof.

18. An optical apparatus as set forth in claim 17, wherein the first lens array and the second lens array respectively constitutes two rows of lens groups aligned in the same pitch, and real images obtained through respective lens groups are composed to form one real image.

19. An image reading apparatus comprising:
an optical apparatus as defined in claim 1;
a light irradiating device; and
an image sensor for optoelectrically converting a real image formed by a light irradiated from the light irradiating device and past through the optical apparatus.

20. An image reading apparatus as set forth in claim 19, wherein the light irradiating device comprises a light source and a light guide device arranged between an image to be read and the optical apparatus for guiding the light from the light source to the image for irradiation on the latter.

21. An image reading apparatus as set forth in claim 20, wherein the light guide device is a light guide plate made of light permeable material and having a light receiving opening for introducing the light from the light source within the material, a first reflector body reflecting the light from the light source introduced through the light receiving opening within the material, a second reflector body for reflecting a light reflected by the first reflector body within the material, an irradiating opening for passing the light reflected by the second reflector body to irradiate on the image, and a passing opening for passing the light reflected from the image past through the irradiating opening to the optical apparatus.

22. An image forming apparatus comprising:
an optical apparatus as defined in claim 1;
a light irradiating device irradiating desired light pattern;
a photosensitive body for forming a latent image by irradiating a illumination pattern formed by a light irradiated by the light irradiating device and past through the optical apparatus.

* * * * *